US012627055B2

(12) United States Patent
Han et al.

(10) Patent No.: US 12,627,055 B2
(45) Date of Patent: May 12, 2026

(54) ELECTRONIC DEVICE COMPRISING A PLURALITY OF ANTENNAS ARRANGED TO PREVENT RESTRICTION OF A RADIO FREQUENCY SIGNAL

(71) Applicant: Samsung Electronics Co., Ltd., Gyeonggi-do (KR)

(72) Inventors: Junhee Han, Gyeonggi-do (KR); Pilwon Seo, Gyeonggi-do (KR); Muyeol Lee, Gyeonggi-do (KR); Inho Shin, Gyeonggi-do (KR); Jiwoo Lee, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 795 days.

(21) Appl. No.: 17/861,832

(22) Filed: Jul. 11, 2022

(65) Prior Publication Data

US 2022/0352637 A1 Nov. 3, 2022

Related U.S. Application Data

(63) Continuation of application No. PCT/KR2021/012889, filed on Sep. 17, 2021.

(30) Foreign Application Priority Data

Sep. 22, 2020 (KR) ........................ 10-2020-0122411

(51) Int. Cl.
*H01Q 1/24* (2006.01)
*H01Q 3/34* (2006.01)
(Continued)

(52) U.S. Cl.
CPC ........... *H01Q 9/0414* (2013.01); *H01Q 1/243* (2013.01); *H01Q 3/34* (2013.01); *H01Q 9/0421* (2013.01); *H01Q 21/205* (2013.01)

(58) Field of Classification Search
CPC ........ H01Q 9/0414; H01Q 1/243; H01Q 3/34; H01Q 9/0421; H01Q 21/205; H01Q 1/241;
(Continued)

(56) References Cited

U.S. PATENT DOCUMENTS 10,270,161 B2 4/2019 Sonoda et al.
10,895,634 B2 1/2021 Nath et al.
(Continued)

FOREIGN PATENT DOCUMENTS

KR 1020150065506 6/2015
KR 10-2019-0095076 8/2019
(Continued)

OTHER PUBLICATIONS

PCT/ISA/210 Search Report issued on PCT/KR2021/012889, Jan. 3, 2022, pp. 6.
(Continued)

*Primary Examiner* — Dameon E Levi
*Assistant Examiner* — Michael M Bouizza
(74) *Attorney, Agent, or Firm* — The Farrell Law Firm, P.C.

(57) ABSTRACT

Disclosed is an electronic device including a window plate comprising a transparent region and an opaque region surrounding the transparent region, a display disposed below the transparent region of the window plate, a housing comprising a first face corresponding to a rear face of the display and a second face corresponding to a side face of the display, the housing surrounding the rear face and the side face of the display, a plurality of antennas disposed between the opaque region of the window plate and the first face of the housing, and a wireless communication module electrically coupled to the plurality of antennas and supporting ultra-wideband communication by using the plurality of
(Continued)

antennas, wherein the plurality of antennas comprises a first antenna disposed along a first edge region corresponding to an edge of the first face of the housing, and a second antenna disposed along a second edge region corresponding to the edge of the first face of the housing and perpendicular to the first edge region.

20 Claims, 16 Drawing Sheets

(51) Int. Cl.
*H01Q 9/04* (2006.01)
*H01Q 21/20* (2006.01)

(58) Field of Classification Search
CPC .......... H01Q 1/2291; H01Q 1/38; H01Q 5/25; H01Q 21/06; H04M 1/02; H04M 1/0266; H04M 1/0277
See application file for complete search history.

(56) References Cited

U.S. PATENT DOCUMENTS

| | | | | |
|---|---|---|---|---|
| 11,177,861 | B2 | 11/2021 | Hong et al. | |
| 2013/0293425 | A1 | 11/2013 | Zhu et al. | |
| 2017/0115941 | A1 | 4/2017 | Kim et al. | |
| 2017/0356980 | A1 | 12/2017 | Islam et al. | |
| 2018/0026341 | A1* | 1/2018 | Mow | H01Q 1/243 343/702 |
| 2019/0165454 | A1* | 5/2019 | Lee | H01Q 1/245 |
| 2019/0246364 | A1 | 8/2019 | Jung et al. | |
| 2019/0257933 | A1 | 8/2019 | Nath et al. | |
| 2019/0386380 | A1* | 12/2019 | Ham | H01Q 1/243 |
| 2020/0021011 | A1 | 1/2020 | Cooper et al. | |
| 2020/0021015 | A1* | 1/2020 | Yun | H01Q 1/2283 |
| 2020/0153115 | A1* | 5/2020 | Yun | H01Q 1/2283 |
| 2020/0274570 | A1 | 8/2020 | Han et al. | |
| 2021/0367319 | A1 | 11/2021 | Moon et al. | |
| 2022/0200640 | A1* | 6/2022 | Kim | H01Q 21/28 |

FOREIGN PATENT DOCUMENTS

| | | |
|---|---|---|
| KR | 10-2019-0100870 | 8/2019 |
| KR | 1020190120639 | 10/2019 |
| KR | 10-2020-0006266 | 1/2020 |
| KR | 1020200022161 | 3/2020 |

OTHER PUBLICATIONS

PCT/ISA/237 Written Opinion issued on PCT/KR2020/012889, Jan. 3, 2022, pp. 4.

Korean Office Action dated Aug. 6, 2024 issued in countepart application No. 10-2020-0122411, 14 pages.

KR Notice of Grant dated Jan. 21, 2024 issued in countepart application No. 10-2020-0122411, 4 pages.

* cited by examiner

ELECTRONIC DEVICE COMPRISING A PLURALITY OF ANTENNAS ARRANGED TO PREVENT RESTRICTION OF A RADIO FREQUENCY SIGNAL

PRIORITY

This application is a Bypass Continuation application of International Application No. PCT/KR2021/012889, which was filed on Sep. 17, 2021, and is based on and claims priority under 35 U.S.C. § 119 to Korean Patent Application No. 10-2020-0122411, which was filed in the Korean Intellectual Property Office on Sep. 22, 2020, the entire disclosure of each of which is incorporated herein by reference.

BACKGROUND

1. Field

The disclosure relates generally to an electronic device, and more particularly, to an electronic device including a plurality of antennas.

2. Description of Related Art

An electronic device may perform positioning on an external electronic device based on ultra-wideband communication and may control a function of the external electronic device or provide the external electronic device with a service based on the determined position.

When performing the positioning on the external electronic device, the electronic device may use angle-of-arrival information obtained for a radio frequency (RF) signal of the external electronic device. In this regard, the electronic device may include a plurality of antennas which receive the RF signal from the external electronic device. For example, in order to cancel a spatial interruption caused by an internal set structure or other components of the electronic device, the plurality of antennas may be disposed to a lower region of a display exposed through a front face of the electronic device.

A plurality of antennas disposed to a lower region of a display may generate a beam of a radiation pattern oriented toward a rear side of the electronic device as opposed to a direction in which the display is visible and may transmit/receive an RF signal with respect to an external electronic device based on generating the beam of the radiation pattern.

However, when a housing of the electronic device disposed to shield (or finish) the lower region of the display is constructed of a metal material, an RF signal characteristic of the plurality of antennas may be distorted due to the metal housing, or a gain of the RF signal transmitted/received by the plurality of antennas may be reduced.

A structure in which an opening is constructed in the metal housing and the plurality of antennas are exposed to the outside through the opening may be considered in order to overcome a restriction caused by the metal housing. However, a glass plate capable of covering an area of the metal housing without impairing the RF signal characteristic of the plurality of antennas may be required so that the plurality of antennas is not visible from the outside. In this case, since the electronic device increases in thickness, it is difficult to make the electronic device slim in size.

SUMMARY

Aspects of the disclosure are to address at least the above-mentioned problems and/or disadvantages and to provide at least the advantages described below. Accordingly, an aspect of the disclosure is to provide a structure of arranging a plurality of antennas in an electronic device including a metal housing and a positioning method which uses the plurality of antennas.

Another aspect of the disclosure is to provide, on an electronic device, an antenna arrangement structure capable of overcoming a restriction of a RF signal characteristic or a restriction of an RF signal gain, which is caused by a metal housing on an electronic device.

In accordance with an aspect of the disclosure, an electronic device may include a window plate comprising a transparent region and an opaque region surrounding the transparent region, a display disposed below the transparent region of the window plate, a housing comprising a first face corresponding to a rear face of the display and a second face corresponding to a side face of the display, the housing surrounding the rear face and the side face of the display, a plurality of antennas disposed between the opaque region of the window plate and the first face of the housing, and a wireless communication module electrically coupled to the plurality of antennas and supporting ultra-wideband communication by using the plurality of antennas, wherein the plurality of antennas comprises a first antenna disposed along a first edge region corresponding to an edge of the first face of the housing, and a second antenna disposed along a second edge region corresponding to the edge of the first face of the housing and perpendicular to the first edge region.

In accordance with another aspect of the disclosure, an electronic device may include a window plate comprising a transparent region and an opaque region surrounding the transparent region, a display disposed below the transparent region of the window plate, a housing comprising a first face corresponding to a rear face of the display and a second face corresponding to a side face of the display, the housing surrounding the rear face and the side face of the display, a plurality of antennas disposed between the opaque region of the window plate and the first face of the housing and comprising a first antenna disposed along a first edge region corresponding to an edge of the first face of the housing and a second antenna disposed along a second edge region corresponding to the edge of the first face of the housing and perpendicular to the first edge region, a wireless communication module electrically coupled to the plurality of antennas and supporting ultra-wideband communication by using the plurality of antennas, and a processor electrically coupled to the display, the plurality of antennas, and the wireless communication module, wherein the processor is configured to receive an RF signal of a specified frequency band from an external electronic device by using at least one of the first antenna and the second antenna, obtain angle-of-arrival information for the RF signal, based on at least part of the RF signal, and determine a position of the external electronic device, based on at least part of the angle-of-arrival information.

BRIEF DESCRIPTION OF THE DRAWINGS

The above and other aspects, features, and advantages of certain embodiments of the disclosure will be more apparent from the following description taken in conjunction with the accompanying drawings, in which.

In the drawings, like reference numerals may be assigned for identical or corresponding components.

DETAILED DESCRIPTION

Hereinafter, various embodiments of the disclosure are described with reference to the accompanying drawings. However, it should be appreciated that this is not intended to limit the technological features set forth herein to particular embodiments. Descriptions of well-known functions and constructions are omitted for the sake of clarity and conciseness.

Figure 1:
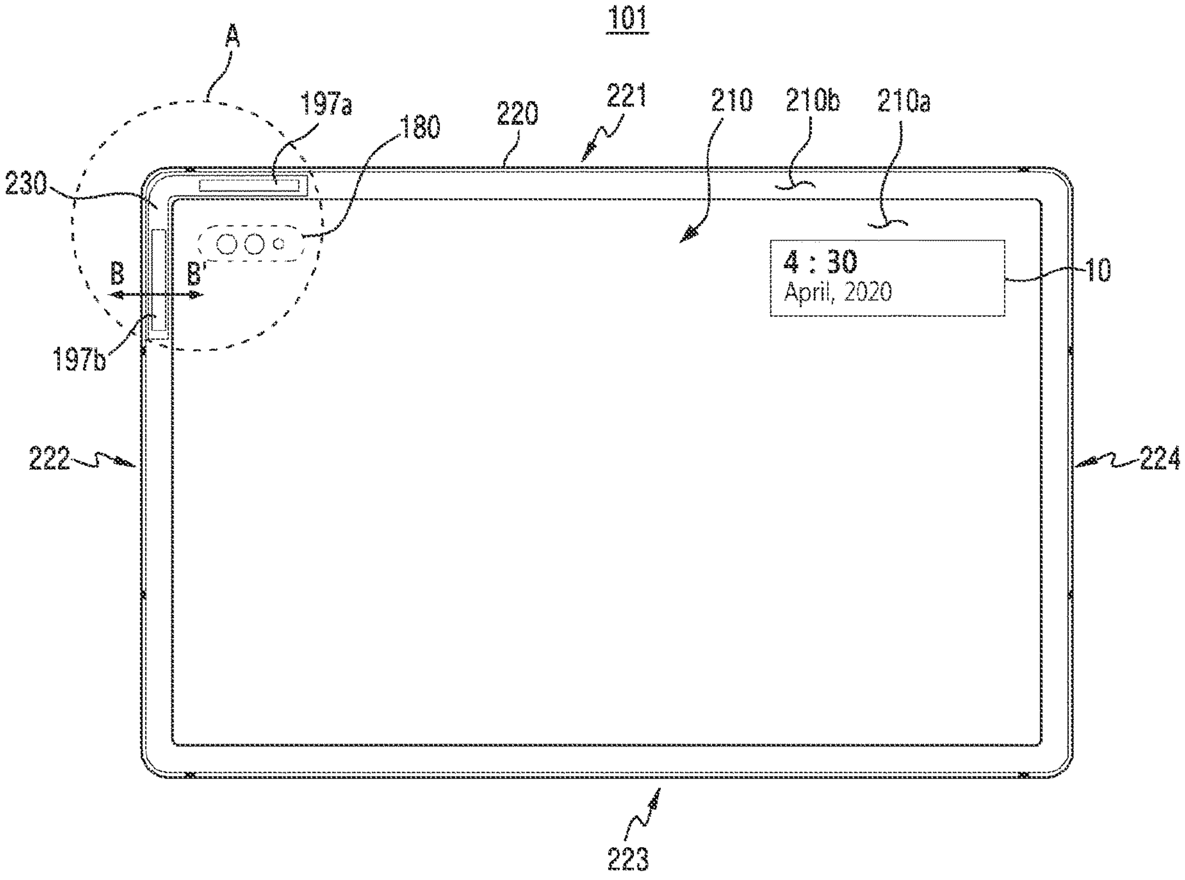
FIG. 1 illustrates an electronic device according to an embodiment.
Figure 2:
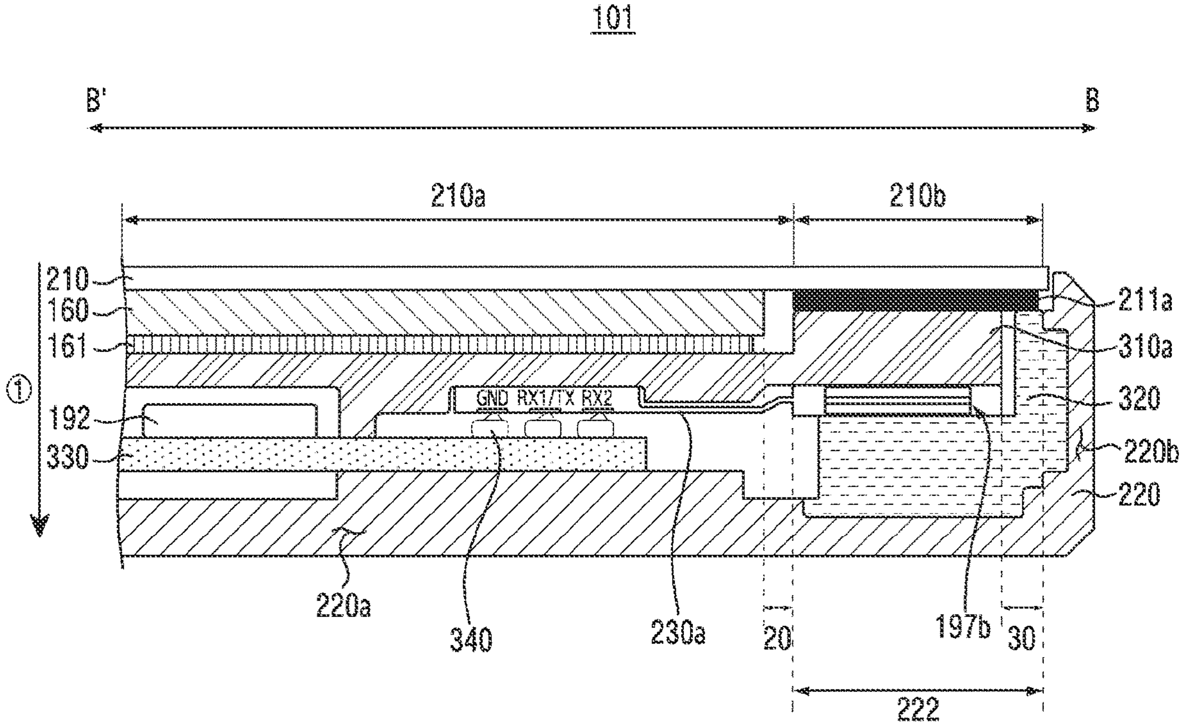
FIG. 2 illustrates a cross-section of an electronic device in one direction according to an embodiment.
Figure 3:
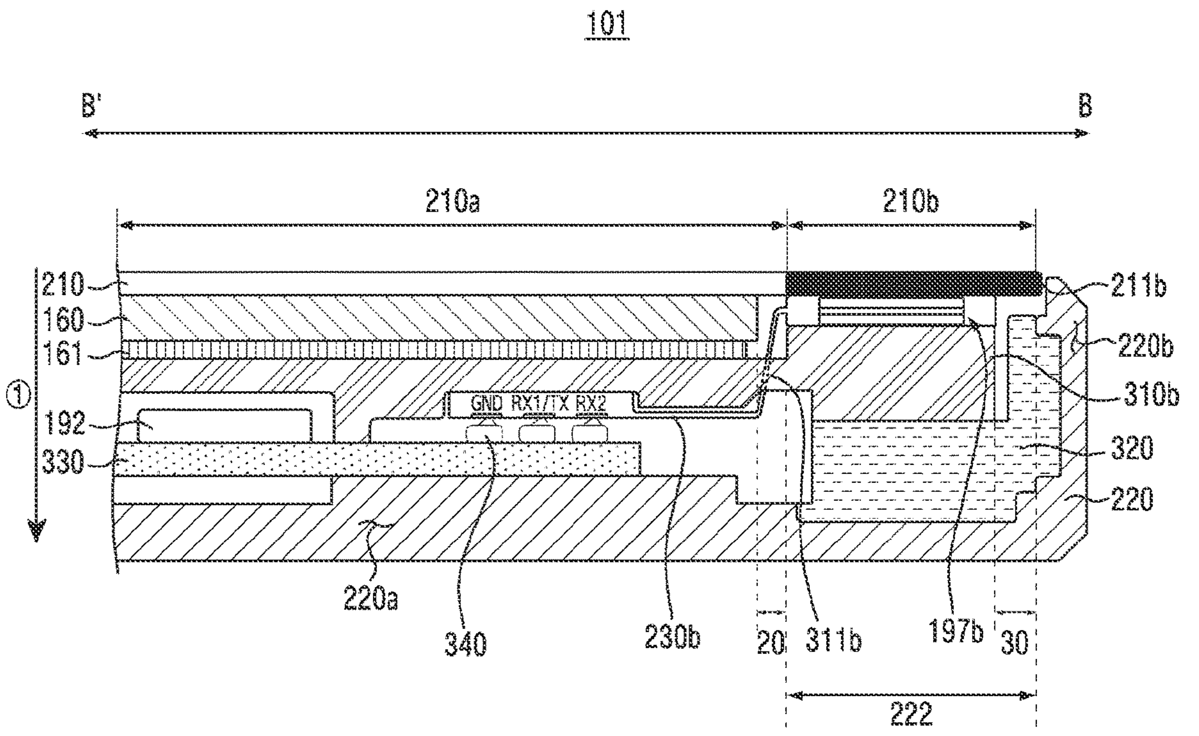
FIG. 3 illustrates a cross-section of an electronic device in one direction according an embodiment.

FIG. 1 illustrates an electronic device according to an embodiment. FIG. 2 illustrates a cross-section of an electronic device in one direction according to an embodiment. FIG. 3 illustrates a cross-section of an electronic device in one direction according to an embodiments. In FIG. 2 and FIG. 3, one direction of the electronic device relates to a direction B-B' illustrated in FIG. 1.

Referring to FIGS. 1, 2, and 3, an electronic device 101 may include a window plate 210, a display 160, a housing 220, and a plurality of antennas 197_a_ and 197_b_. The electronic device 101 may omit at least one of the components, or may include at least one additional component. For example, the electronic device 101 may correspond to an electronic device 1601 described below with reference to FIG. 16 Accordingly, and may further include at least some of components included in the electronic device 1601 of FIG. 16.

The window plate 210 may finish the housing 220 by being coupled with the housing 220 of which one region is open, thereby constructing at least part of a front face of the electronic device 101. The display 160 may be disposed to a lower region corresponding to a direction ① of the window plate 210, and the window plate 210 may transmit light generated by the display 160 through some regions thereof. For example, the window plate 210 may include a transparent region 210_a_ (or a view region) through which content 10 is visible by transmitting the light caused by the display 160 and an opaque region 210_b_ (or a blind region) surrounding an edge of the transparent region 210_a_. According to various embodiments, in order to prevent an inner side of the electronic device 101 from being viewed, the opaque region 210_b_ may be implemented such that an opaque film 211_a_ is adhered or coated along an edge of a rear face of the window plate 210 (see FIG. 2), or may be implemented such that an edge of the window plate 210 is painted with opaque color 211_b_ (see FIG. 3).

The display 160 may include a display region. The display region may be disposed to a lower portion corresponding to the direction ① of the transparent region 210_a_ of the window plate 210, so that at least part of the display region is visually exposed to the outside through the transparent region 210_a_. The display region of the display 160 may include at least one pixel, and the content 10 output by the display 160 based on the at least one pixel may be viewed to a user through the transparent region 210_a_. The display 160 may further include a non-display region extending from the display region to a lower portion corresponding to the direction ① of the opaque region 210_b_ of the window plate 210 (e.g., extending not to overlap with the plurality of antenna 197_a_ and 197_b_), and the non-display region may not be viewed from the outside through the opaque region 210_b_.

The display 160 may include a liquid crystal display (LCD) display, a light-emitting diode (LED) display, an organic LED (OLED) display, or a microelectromechanical systems (MEMS) display. The display 160 may include at least one of a touch sensor configured to detect an input caused by a user's body and applied to the window plate 210, a digitizer configured to detect an input caused by a digital pen, and a pressure sensor configured to measure an intensity of strength generated by the input.

The housing 220 may constitute at least part of the exterior of the electronic device 101 by being coupled to the window plate 210. For example, the housing 220 may include a first face 220_a_ facing a rear face of the display 160 and a second face 220_b_ facing a side face of the display 160, and may constitute a rear face and side face of the electronic device 101 by being coupled to the window plate 210 so that the first face 220_a_ and the second face 220_b_ surround the display 160. At least one region of the second face 220_b_ may seamlessly extend by being bent toward the window plate 210 or the first face 220_a_. At least part of at least one of the first face 220_a_ and the second face 220_b_ may be constructed of a metal material. The first face 220_a_ and second face 220_b_ of the housing 220 may be constructed integrally, but the disclosure is not limited thereto. For example, the first face 220_a_ and second face 220_b_ of the housing 220 may be constructed to be separated from each other and may constitute the housing 220 through a combination of the components.

The housing 220 may include a plurality of edge regions corresponding to an edge of the first face 220_a_. For example, the housing 220 may include a first edge region 221, a second edge region 222 perpendicular to the first edge region 221, a third edge region 223 perpendicular to the second edge region 222 and parallel to the first edge region 221, and a fourth edge region 224 perpendicular to the first edge region 221 or the third edge region 223 and parallel to the second edge region 222. The plurality of edge regions 221, 222, 223, and 224 may overlap at least in part with the opaque region 210b included in the window plate 210 when the window plate 210 is viewed in the direction ①.

A combination of the window plate 210 and the housing 220 may constitute an inner space of the electronic device 101, and various components related to driving or operating the electronic device 101 may be disposed in the inner space. For example, a shielding sheet 161 which provides an electromagnetic shielding structure may be disposed in the inner space of the electronic device 101 so that electromagnetic waves generated from some components are prevented from affecting some other components by electromagnetic interference, and a main printed circuit board (PCB) 330 may be disposed on the first face 220a of the housing 220 to electrically mount a variety of components.

In addition, a set construction which provides mechanical rigidity may be disposed in the inner space to support some components. For example, a first support frame 310a may be disposed to a lower region corresponding to the direction ① of the display 160 to support the display 160. The first support frame 310a may extend to a lower portion corresponding to the direction ① of the opaque region 210b of the window plate 210 and thus may be in contact with the opaque film 211a (see FIG. 2). A second support frame 310b may be disposed in the lower region of the display 160 to support the display 160. The second support frame 310b may extend to the lower portion corresponding to the direction ① of the opaque region 210b of the window plate 210 and thus may be spaced apart by a specified interval from the window plate 210 pained with the opaque color 211b (see FIG. 3).

The plurality of antennas 197a and 197b may be disposed between the opaque region 210b of the window plate 210 and the first face 220a of the housing 220 to transmit/receive an RF signal or data with respect to at least one external electronic device, based on at least one of ultra-wideband communication, Bluetooth™ communication, and wireless fidelity (WiFi) communication. The plurality of antennas 197a and 197b may include the first antenna 197a disposed along the first edge region 221 corresponding to the edge of the first face 220a of the housing 220 and the second antenna 197b disposed along the second edge region 222 perpendicular to the first edge region 221. The first antenna 197a and the second antenna 197b may be disposed on a flexible PCB (FPCB) 230 extending from the first edge region 221 to the second edge region 222, and the first antenna 197a, the second antenna 197b, and the FPCB 230 may be integrated to constitute one antenna module. Each of the first antenna 197a and the second antenna 197b may be constructed of a plurality of layers including a signal layer having a feed for a signal input/output and a ground layer stacked with the signal layer. For example, on the plurality of layers, the signal layer may be disposed such that one face of the signal layer faces the window plate 210, and the ground layer may be disposed such that one face of the ground layer faces the first face 220a of the housing 220 in a lower portion corresponding to the direction ① of the other face of the signal layer. The first antenna 197a and the second antenna 197b may include at least one of a patch antenna, a monopole antenna, a dipole antenna, a biconical antenna, a horn antenna, and a spiral antenna which have an ultra-wideband signal characteristic, and may generate a beam of a radiation pattern oriented toward a front side facing the window plate 210 of the electronic device 101.

The FPCB 230 may include a first FPCB 230a. One region of the first FPCB 230a may be in contact with a rear face of the first support frame 310a extending to the lower portion of the opaque region 210b of the window plate 210, and the other region of the first FPCB 230a may extend toward the main PCB 330 (see FIG. 2). Alternatively, the FPCB 230 may include a second FPCB 230b. One region of the second FPCB 230b may be disposed between the window plate 210 pained with the opaque color 211b and the second support frame 310b spaced apart from the window plate 210, and the other region of the second FPCB 230b may extend toward the main PCB 330 by penetrating the second support frame 310b through a slit 311b (or an opening, a hole, an aperture, or a recess) constructed at the second support frame 310b (see FIG. 3).

At least one of the first FPCB 230a and the second FPCB 230b may be constructed such that one region extending to a lower portion of the opaque region 210b of the window plate 210 or between the opaque region 210b of the window plate 210 and the second support frame 310b is constructed of a flexible substrate material and the other region extending toward the main PCB 330 is constructed of a coaxial cable material. For example, at least one of the first FPCB 230a and the second FPCB 230b may include a structure in which different kinds of materials such the flexible substrate and the coaxial cable are combined. The first support frame 310a and the second support frame 310b may be omitted on the electronic device 101. In this case, the first FPCB 230a or the second FPCB 230b may be adhered to a rear face of the opaque film 211a or a rear face of the window plate 210 painted with the opaque color 211b, and the other region of the FPCB 230 may extend toward the main PCB 330.

The first FPCB 230a or the second FPCB 230b may be electrically coupled to the main PCB 330 through a plurality of conductive connectors 340. Accordingly, the first antenna 197a and second antenna 197b disposed on the FPCB 230 may be electrically coupled to a wireless communication module 192 disposed on the main PCB 330, through the FPCB 230, the plurality of conductive connectors 340, and the main PCB 330.

The first FPCB 230a or the second FPCB 230b disposed between the opaque region 210b of the window plate 210 and the first face 220a of the housing 220 may be spaced apart by a specified distance from the display 160 and the second face 220b of the housing 220. For example, one region of the FPCB 230 may be spaced apart from the display 160 by a first distance 20 so that the first antenna 197a and the second antenna 197b are not affected by signal interference caused by driving of the display 160, and similarly, may be spaced apart from the second face 220b of the housing 220 by a second distance 30 identical to or different from the first distance 20 so that the first antenna 197a and the second antenna 197b are not affected by signal interference caused by the second face 220b of the housing 220 including a metal material at least in part. In this regard, a third support frame 320 may be disposed between the opaque region 210b of the window plate 210 and the first face 220a of the housing 220 to facilitate the construction of the second distance 30. For example, the third support frame 320 may be disposed in an in-mold manner so that the second distance 30 is constructed between one region of the FPCB 230 and the second face 220b of the housing 220 while supporting the first support frame 310a or the second support frame 310b and the first FPCB 230a or the second FPCB 230b. The third support frame 320 may be constructed of a dielectric material having a unique permittivity so as not to impair signal characteristics of the first antenna 197a and second antenna 197b disposed on the FPCB 230.

The first FPCB 230a or the second FPCB 230b may include a ground pattern (or a ground wall) constructed to surround at least part of an edge of the FPCB 230. The FPCB 230 including the ground pattern may be disposed relatively close to the second face 220*b* of the housing 220, compared to when the ground pattern is not included. Accordingly, since influence of signal interference caused by the second face 220*b* of the housing 220 including a metal material at least in part is minimized by means of the ground pattern, the signal characteristic of the first antenna 197*a* and second antenna 197*b* disposed on the FPCB 230 may be stabilized. The ground pattern (or the ground wall) may be constructed on at least one of an upper face of the third support frame 320, a rear face of the first support frame 310*a*, and an upper face of the second support frame 310*b*, which are in contact at least in part with the FPCB 230.

A camera module 180 supporting capturing of a still or moving image of the electronic device 101 may be disposed to a region adjacent to an antenna module including the first antenna 197*a*, the second antenna 197*b*, and the FPCB 230. In this case, distance information between the electronic device 101 and an external electronic device 400 (see FIG. 4), obtained by using the first antenna 197*a* and the second antenna 197*b*, may be calculated or accessed to determine a capture mode (e.g., a wide angle mode or a telephoto mode) of the camera module 180. Determining the capture mode of the camera module 180 may include switching a current capture mode of the camera module 180 to a determined capture mode. Alternatively, determining the capture mode of the camera module 180 may include activating at least one camera module suitable for the determined capture mode among a plurality of camera modules included in the electronic device 101 and setting the capture mode of the activated at least one camera module to the determined capture mode. Alternatively, positioning information for the external electronic device 400, obtained by using the first antenna 197*a* and the second antenna 197*b*, may be calculated or accessed to determine whether the external device exists within a field of view (FOV) range of the camera module 180.

Figure 4:
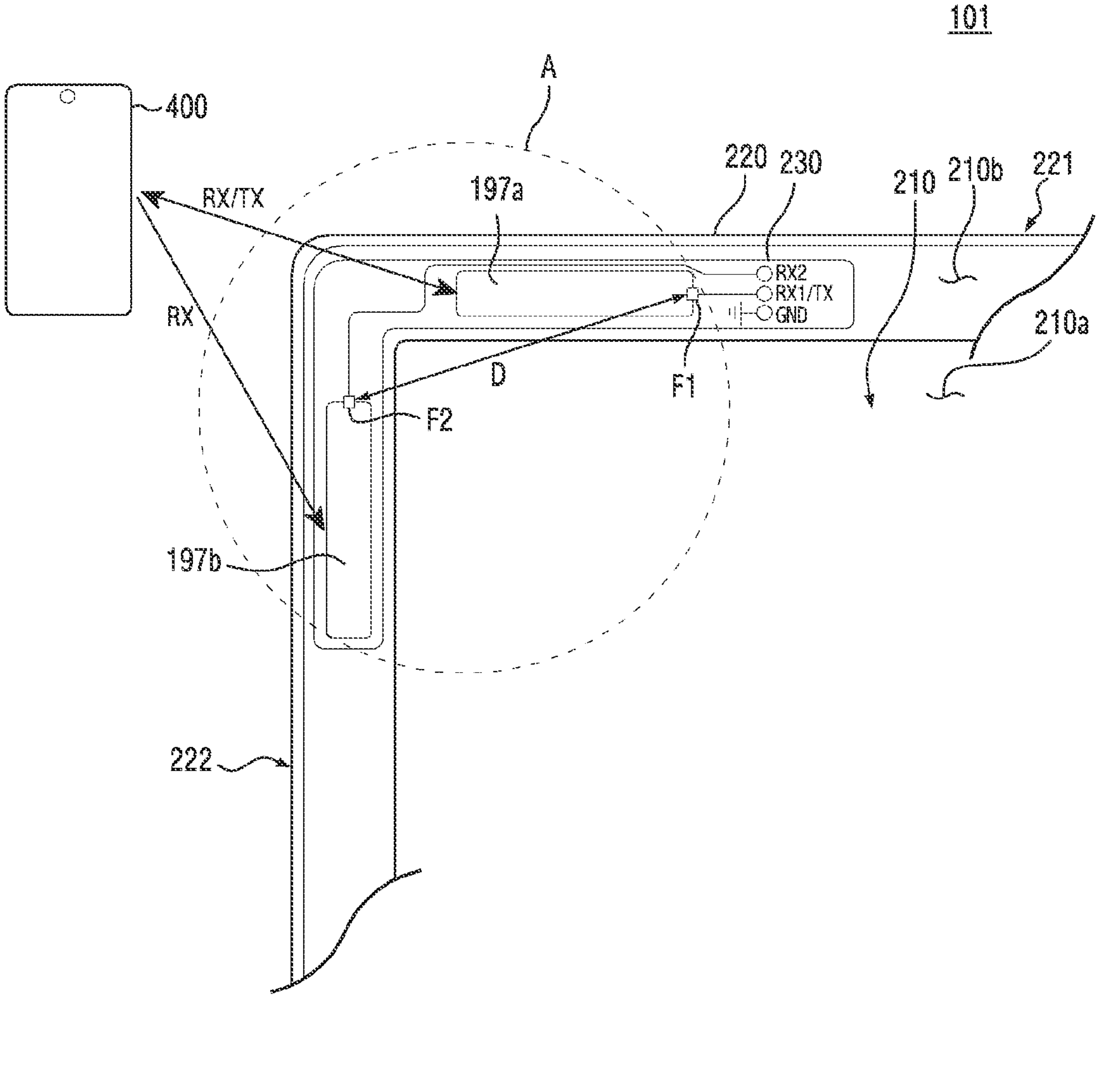
FIG. 4 illustrates a plurality of antennas of an electronic device according to a first embodiment.

FIG. 4 illustrates a plurality of antennas of an electronic device according to an embodiment. In FIG. 4, the same reference numerals may be assigned to components corresponding to the aforementioned components, and redundant descriptions may be omitted.

Referring to FIG. 4, a first antenna 197*a* and second antenna 197*b* disposed on an FPCB 230 may transmit/receive an RF signal or data with respect to an external electronic device 400. For example, an electronic device 101 may transmit (TX) the RF signal or data to the external electronic device 400 by using the first antenna 197*a* and may receive (RX) the RF signal or data from the external electronic device 400 by using at least one of the first antenna 197*a* and the second antenna 197*b*.

The first antenna 197*a* and the second antenna 197*b* may be disposed in a right angle relation to each other and to be spaced apart from each other by a specified separation distance D respectively in a first edge region 221 corresponding to an edge of a first face 220*a* of a housing 220 and a second edge region 222 perpendicular to the first edge region 221. The specified separation distance D may correspond to a distance between a first feeding point F1 of the first antenna 197*a* and a second feeding point F2 of the second antenna 197*b*. For example, the specified separation distance D may be designed to have a value (e.g., about 10 mm to 30 mm) close to a half-wavelength of an RF signal that can be transmitted/received through an ultra-wideband communication channel (e.g., CH 5 or CH 9) of a specified frequency band of about 6.2 GHz to 6.7 GHz, or about 7.75 GHz to 8.25 GHz, based on the first antenna 197*a* and the second antenna 197*b*.

Figure 5:
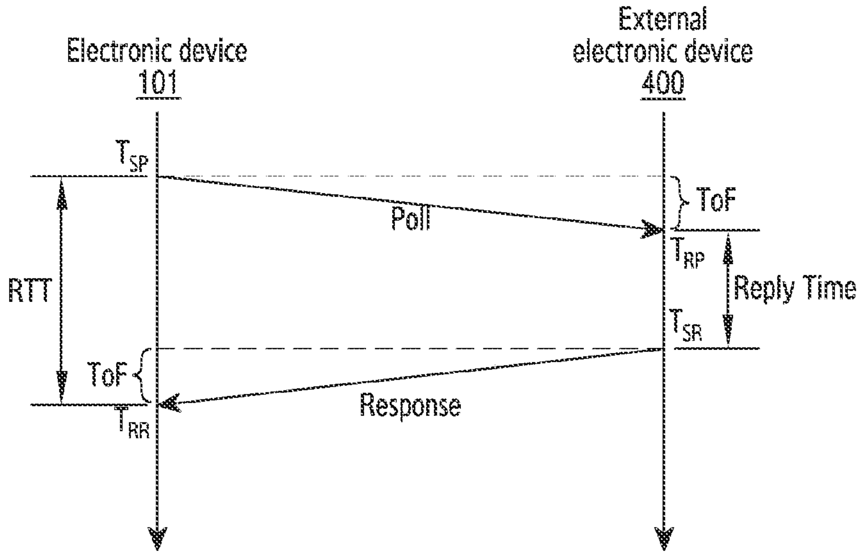
FIG. 5 illustrates message transmission/reception between an electronic device and an external electronic device according to an embodiment.
Figure 6:
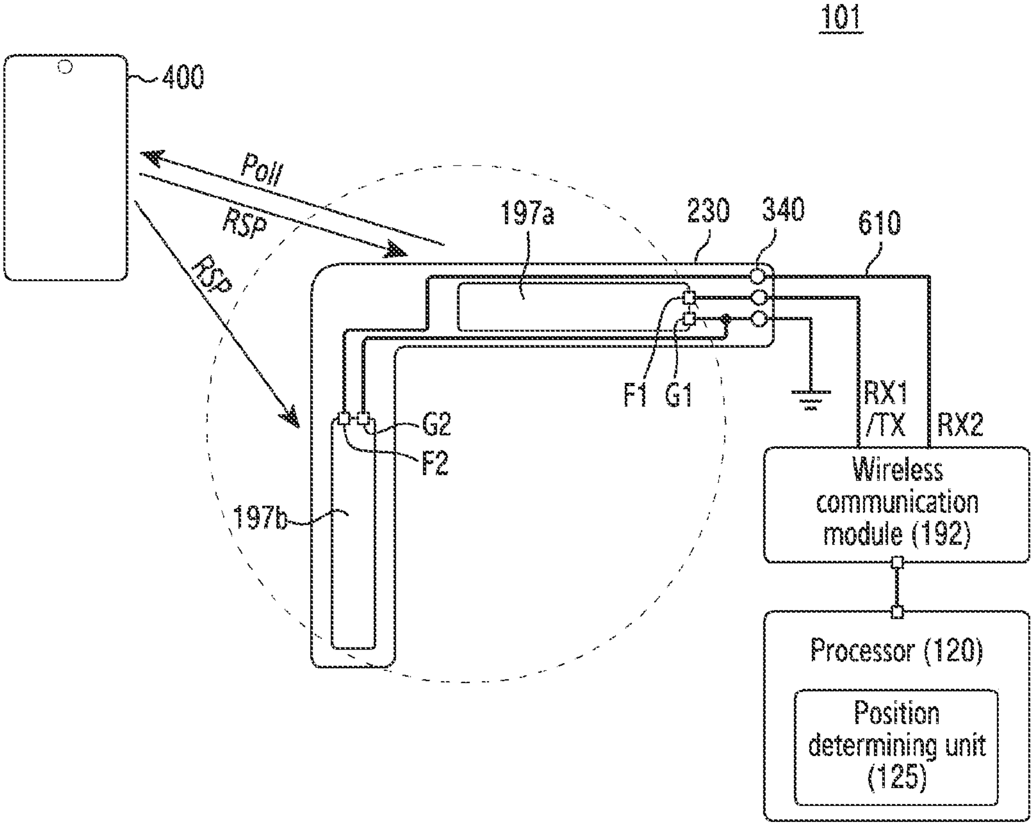
FIG. 6 illustrates a method of obtaining distance information between an electronic device and an external electronic device according to an embodiment.

FIG. 5 illustrates message transmission/reception between an electronic device and an external electronic device according to an embodiment. FIG. 6 illustrates a method of obtaining distance information between an electronic device and an external electronic device according to an embodiment. In FIGS. 5 and 6, the same reference numerals may be assigned to components corresponding to the aforementioned components, and redundant descriptions may be omitted.

Referring to FIGS. 5 and 6, a first feeding point F1 included in a first antenna 197*a* may be electrically coupled to a first RX port (RX1)/TX port included in a wireless communication module 192 through a conductive connector 340 and a conductive line 610. In this case, an RF signal or data received by the first antenna 197*a* may be transferred to the wireless communication module 192, and an RF signal or data to be transmitted by the first antenna 197*a* may be transferred from the wireless communication module 192 to the first antenna 197*a* Similarly, a second feeding point F2 included in a second antenna 197*b* may be electrically coupled to a second RX port (RX2) included in the wireless communication module 192 through the conductive connector 340 and the conductive line 610. Accordingly, an RF signal or data to be received by the second antenna 197*b* may be transferred to the wireless communication module 192. In addition, the first antenna 197*a* and the second antenna 197*b* may respectively include a first ground point G1 and a second ground point G2, wherein the first ground point G1 and the second ground point G2 may be coupled to the ground through the conductive connector 340 and the conductive line 610.

An FPCB 230 on which the first antenna 197*a* and the second antenna 197*b* are disposed may include a plurality of layers. For example, the FPCB 230 may include at least one first layer including at least one of the first antenna 197*a*, the first point F1, the first ground point G1, the second antenna 197*b*, the second point F2, and the second ground point G2, and a second layer stacked with the at least one first layer and including a ground. The FPCB 230 may further include a connection member, such as a signal wiring, a conductive gasket, a conductive via-hole, or a C-clip, which electrically couples the first ground point G1 and second ground point G2 included in the at least one first layer and the ground included in the second layer. A feeding structure may be designed for at least one of the first antenna 197*a* and the second antenna 197*b*, so that the first antenna 197*a* and second antenna 197*b* disposed perpendicular to each other generate a beam of a radiation pattern oriented in different directions with respect to an axis with 45 degrees against an axis in the direction of B-B' of FIG. 1 while crossing the first antenna 197*a* and the second antenna 197*b*.

An electronic device 101 may include a processor 120 electrically coupled to the wireless communication module 192. The processor 120 may obtain distance information between the electronic device 101 and an external electronic device 400 by using a specified ranging scheme, such as two way ranging (TWR). For example, the processor 120 may obtain the distance information between the electronic device 101 and the external electronic device 400 by using a single sided-TWR (SS-TWR) scheme or a double sided-TWR (DS-TWR) scheme. A signal transmitted/received between the electronic device 101 and the external electronic device 400 based on the ranging scheme may include at least one of a ranging request message, a ranging response message, a final message, and a ranging control message.

In the above description, the wireless communication module 192 may transmit (or broadcast) a first RF signal of a specified frequency band (e.g., about 6.2 GHz to 6.7 GHz, or about 7.75 GHz to 8.25 GHz) supported by an ultra-wideband communication channel (e.g., CH 5 or CH 9) by using the first antenna 197*a*, under the control of the processor 120. For example, the processor 120 may control the wireless communication module 192 to transmit (or broadcast) the first RF signal included in a poll message (or packet) indicating a distance measurement request by using the first antenna 197*a*. The processor 120 may identify a transmission (or broadcasting) time $T_{SP}$ of the first RF signal, in response to the transmission (or broadcasting) of the first RF signal. The first RF signal may be received (or detected) by the external electronic device 400 after a specific time of flight (ToF) elapses from the transmission (or broadcasting) time $T_{SP}$.

The external electronic device 400 may transmit a second RF signal of a specified frequency band supported by the ultra-wideband communication, in response to the reception (or detection) of the first RF signal. For example, the external electronic device 400 may transmit the second RF signal including a response message (or packet) responding to the poll message at a time $T_{SR}$ at which a specific replay ($_{SR}$) time elapses from a reception ($_{RP}$) (or detection) time $T_{RP}$ of the first RF signal.

The wireless communication module 192 may receive the second RF signal by using at least one of the first antenna 197*a* and the second antenna 197*b* at a time $T_{RR}$ at which a specific ToF elapses from the transmission time $T_{SR}$ of the second RF signal. The processor 120 may calculate a round trip time (RTT) indicating an RF signal roundtrip time between the electronic device 101 and the external electronic device 400, in response to the reception of the second RF signal. For example, the processor 120 may calculate an RTT corresponding to a difference between the transmission time $T_{SP}$ of the first RF signal and the reception time $T_{RR}$ of the second RF signal and may obtain distance information between the electronic device 101 and the external electronic device 400, based on the RTT.

The electronic device 101 may include a position determining unit 125 configured independently of or as a part of the processor 120. The position determining unit 125 may perform an operation related to obtaining the aforementioned distance information of the processor 120 or obtaining angle-of-arrival or direction information of the processor 120, to be described below. Hereinafter, unless otherwise specified, operations performed by the processor 120 may be understood to be equally performed by the position determining unit 125.

Figure 7:
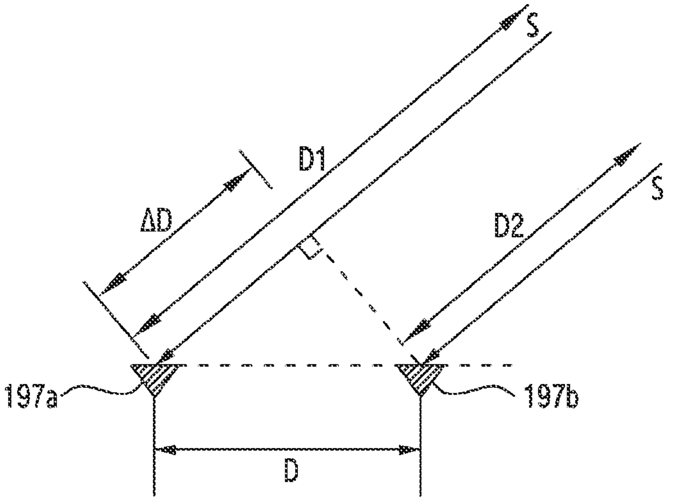
FIG. 7 illustrates an RF signal received from an external electronic device of an electronic device according to an embodiment.
Figure 8:
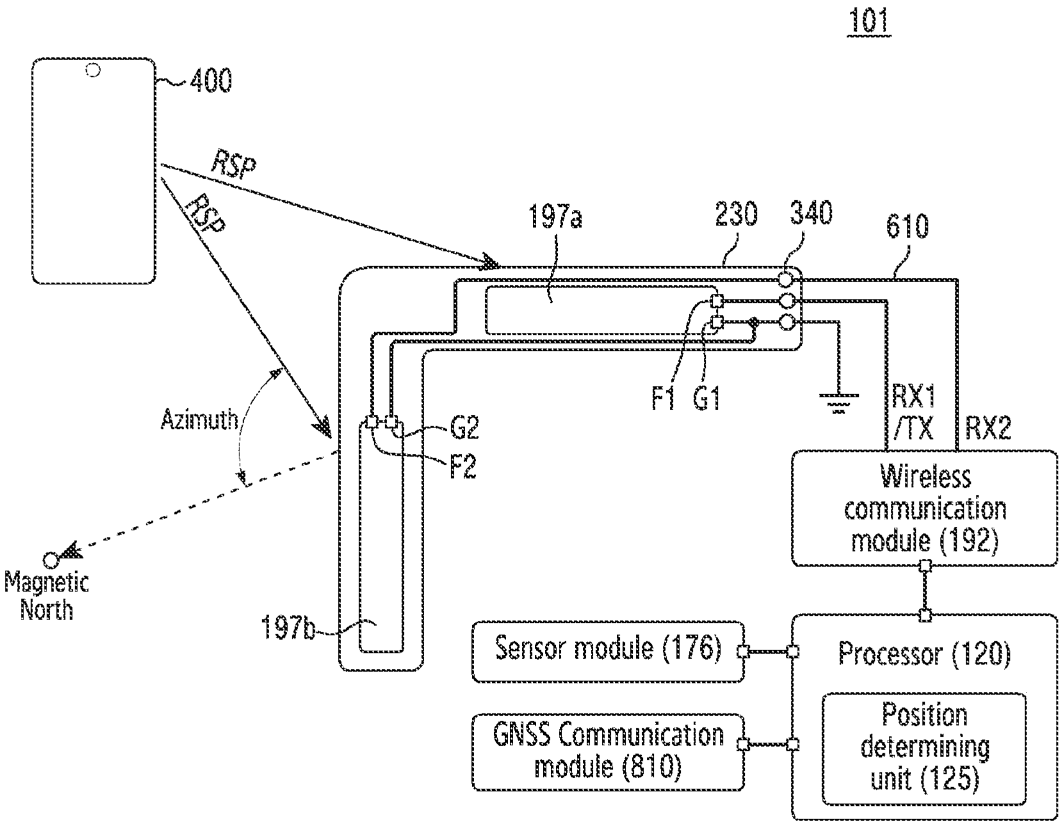
FIG. 8 illustrates a method of obtaining angle-of-arrival information for an RF signal received from an external electronic device of an electronic device according to an embodiment.

FIG. 7 illustrates an RF signal received from an external electronic device of an electronic device according to an embodiment. FIG. 8 illustrates a method of obtaining angle-of-arrival information for an RF signal received from an external electronic device of an electronic device according to an embodiment. In FIGS. 7 and 8, the same reference numerals may be assigned to components corresponding to the aforementioned components, and redundant descriptions may be omitted.

Referring to FIGS. 7 and 8, a wireless communication module 192 may receive an RF signal S transmitted from an external electronic device 400 by using a first antenna 197*a* and a second antenna 197*b* under the control of a processor 120. The RF signal S received from the external electronic device 400 may be of a specified frequency band (e.g., about 6.2 GHz to 6.7 GHz, or about 7.75 GHz to 8.25 GHz) supported by an ultra-wideband communication channel (e.g., CH 5 or CH 9), or may correspond to a second RF signal including a response message (or packet) described above with reference to FIG. 5 and FIG. 6, or may include a signal distinct to the second RF signal.

The processor 120 may calculate a difference ΔD between a reception distance D1 of an RF signal S received through the first antenna 197*a* and a reception distance D2 of an RF signal S received through the second antenna 197*b* based on a difference between a time at which the RF signal S is received through the first antenna 197*a* and a time at which the RF signal S is received through the second antenna 197*b*. The processor 120 may calculate a phase difference ΔØ of the RF signals S, based on the calculated reception distance difference ΔD of the RF signals S. For example, the processor 120 may calculate the phase difference ΔØ for the RF signals S received respectively through the first antenna 197*a* and the second antenna 197*b* by using Equation (1) below, in which λ may denote a wavelength of the RF signal S received from the external electronic device 400.

$$\Delta\phi = \frac{2\pi}{\lambda}\Delta D \tag{1}$$

The processor 120 may calculate an angle-of-arrival θ (or direction information) of the RF signal S received from the external electronic device 400 by using Equation (2) below, by using a separation distance D between the first antenna 197*a* and the second antenna 197*b* (e.g., a distance between a first point F1 of the first antenna 197*a* and a second point F2 of the second antenna 197*b*) and a phase difference ΔØ for the RF signals S received respectively through the first antenna 197*a* and the second antenna 197*b*.

$$AOA(\theta) = \cos^{-1}\frac{\Delta\phi}{2\pi D/\lambda} \tag{2}$$

The processor 120 may determine a position of the external electronic device 400, based at least in part on the information on the angle-of-arrival θ (or direction information) obtained for the RF signal S of the external electronic device 400. In this regard, the processor 120 may obtain posture information (e.g., at least one of a roll value, a pitch value, and an azimuth value) of the electronic device 101 from a 9-axis sensor or gyro sensor included in a sensor module 176, and may obtain magnetic north direction information from a magnetic sensor included in the sensor module 176 or a global navigation satellite system (GNSS) communication module 810 included in the wireless communication module 192. The processor 120 may determine the position of the external electronic device 400 by determining a relative azimuth of the external electronic device 400 with respect to a magnetic north direction, based on at least one of the obtained information on the angle-of-arrival θ (or direction information), the posture information of the electronic device, and the magnetic north direction information. The processor 120 may transmit a signal or data related to controlling of a function of a corresponding device to the external electronic device 400 or may transmit a signal or data related to providing of a position-based service, based on the determined position of the electronic device 400.

Figure 9:
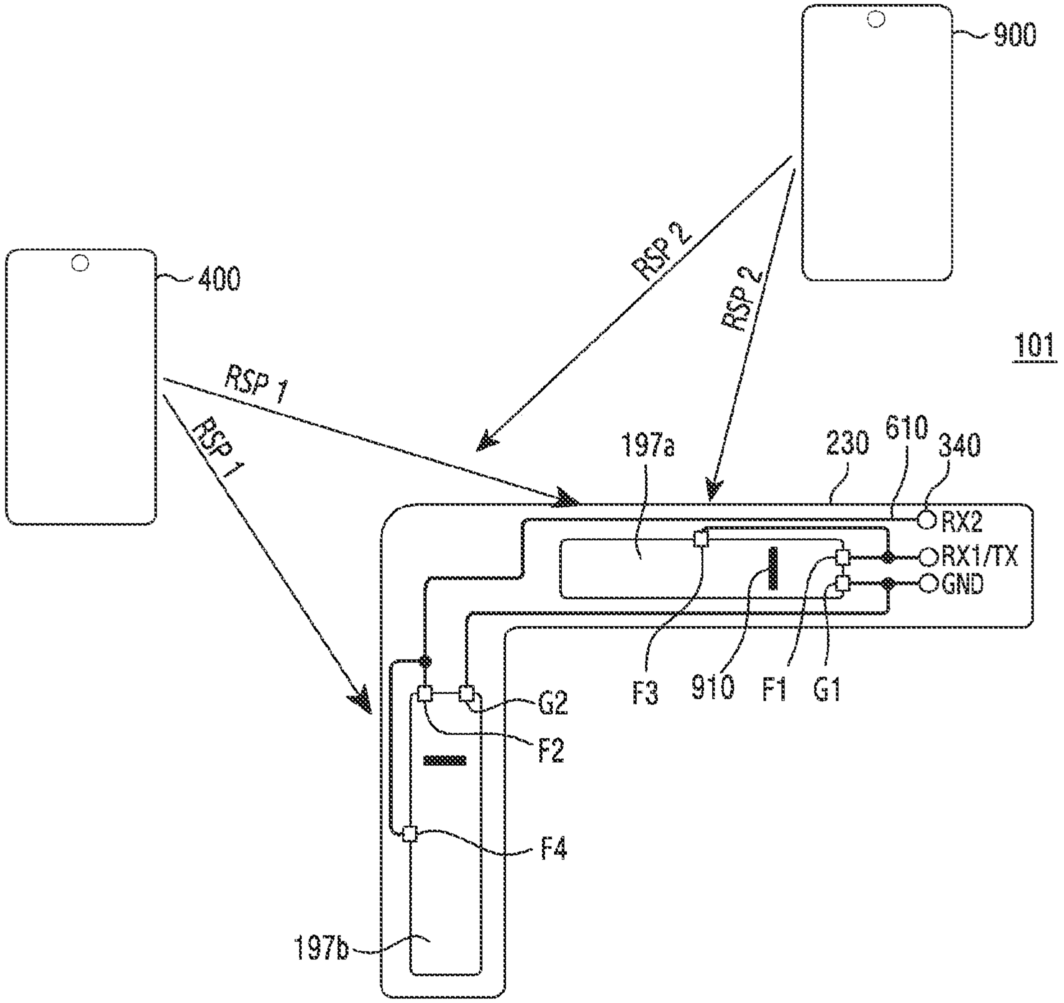
FIG. 9 illustrates a plurality of antennas of an electronic device according to an embodiment.

FIG. 9 illustrates a plurality of antennas of an electronic device according to an embodiment. In FIG. 9, the same reference numerals may be assigned to components corresponding to the aforementioned components, and redundant descriptions may be omitted.

Referring to FIG. 9, an electronic device 101 may perform ultra-wideband communication with a first external electronic device 400 and a second external electronic device 900 by using a first antenna 197*a* and a second antenna 197*b* which are configured to have a dual resonant frequency characteristic. In this regard, the first antenna 197*a* may include a first feeding point F1 supporting transmission and reception of an RF signal through a first ultra-wideband communication channel (e.g., CH 5) and a third feeding point F3 constructed at a position different from the first point F1 on the first antenna 197*a* and supporting transmission and reception of an RF signal through a second ultra-wideband communication channel (e.g., CH 9). Correspondingly, the second antenna 197*b* may include a second feeding point F2 supporting transmission and reception of an RF signal through the first ultra-wideband communication channel and a fourth feeding point F4 constructed at a position different from the second feeding point F2 on the second antenna 197*b* and supporting transmission and reception of an RF signal through the second ultra-wideband communication channel. When the feeding points F1, F2, F3, and F4 are different from each other the first antenna 197*a* or the second antenna 197*b*, a characteristic of an RF signal input/output through a single feeding point and a characteristic of an RF signal input/output through another single feeding point may be different at least in part from each other. Such a feeding structure may be caused by a dual resonant frequency characteristic of the single antenna.

A signal layer and a ground layer which are respectively included in the first antenna 197*a* and the second antenna 197*b* may be electrically coupled through a shorting wall 910 in which a plurality of vias are aligned. The shorting wall 910 in which the plurality of vias is aligned may induce a signal (or current) input/output through a feeding point of each of the first antenna 197*a* and the second antenna 197*b* or may control a flow of the input/output signal (or current). Accordingly, a dual resonant frequency characteristic of the first antenna 197*a* and second antenna 197*b* may be adjusted. At least one of the first antenna 197*a* and the second antenna 197*b* may include the plurality of shorting walls 910 in which the plurality of vias are aligned, regarding the adjustment of the dual resonant frequency characteristic. For example, the first antenna 197*a* may include a first shorting wall 910 disposed perpendicular to a signal input/output direction of the first point F1 and a second shorting wall disposed perpendicular to a signal input/output direction of the third feeding point F3. Similarly, the second antenna 197*b* may include a first shorting wall perpendicular to a signal input/output direction of the second feeding point F2 and a second shorting wall perpendicular to a signal input/output direction of the fourth feeding point F4.

The electronic device 101 may transmit and receive an RF signal of a frequency band (e.g., about 6.2 GHz to 6.7 GHz) supported by the first ultra-wideband communication channel (e.g., CH 5) with respect to the first external electronic device 400 by using the first antenna 197*a* and the second antenna 197*b*. In this operation, a processor of the electronic device 101 may control a wireless communication module 192 so that the transmitted/received RF signal is input/output through a conductive connector 340 and a conductive line 610, between the RX1/TX port of a wireless communication module 192 and the first feeding point F1 of the first antenna 197*a* and between the RX2 port of the wireless communication module 192 and the second feeding point F2 of the second antenna 197*b*.

The electronic device 101 may transmit/receive an RF signal of a frequency band (e.g., about 7.75 GHz to 8.25 GHz) supported by the second ultra-wideband communication channel (e.g., CH 9) with respect to the second external electronic device 900 by using the first antenna 197*a* and the second antenna 197*b*. When using the second ultra-wideband communication channel, a processor 120 may control the wireless communication module 192 so that the transmitted/received RF signal is input/output through the conductive connector 340 and the conductive line 610, between the RX1/TX port of the wireless communication module 192 and the third feeding point F3 of the first antenna 197*a* and between the RX2 port of the wireless communication module 192 and the fourth feeding point F4 of the second antenna 197*b*.

The electronic device 101 may perform ultra-wideband communication with the first external electronic device 400, based on the first point F1 of the first antenna 197*a* and the second point F2 of the second antenna point 197*b* and ultra-wideband communication with the second external electronic device 900, based on the third feeding point F3 of the first antenna 197*a* and the fourth feeding point F4 of the second antenna 197*b*, sequentially or alternately according to a specified order, in order to selectively operate the first feeding point F1 and the third feeding point F3 included in the first antenna 197*a* or to selectively operate the second feeding point F2 and the fourth feeding point F4 included in the second antenna 197*b*.

Figure 10:
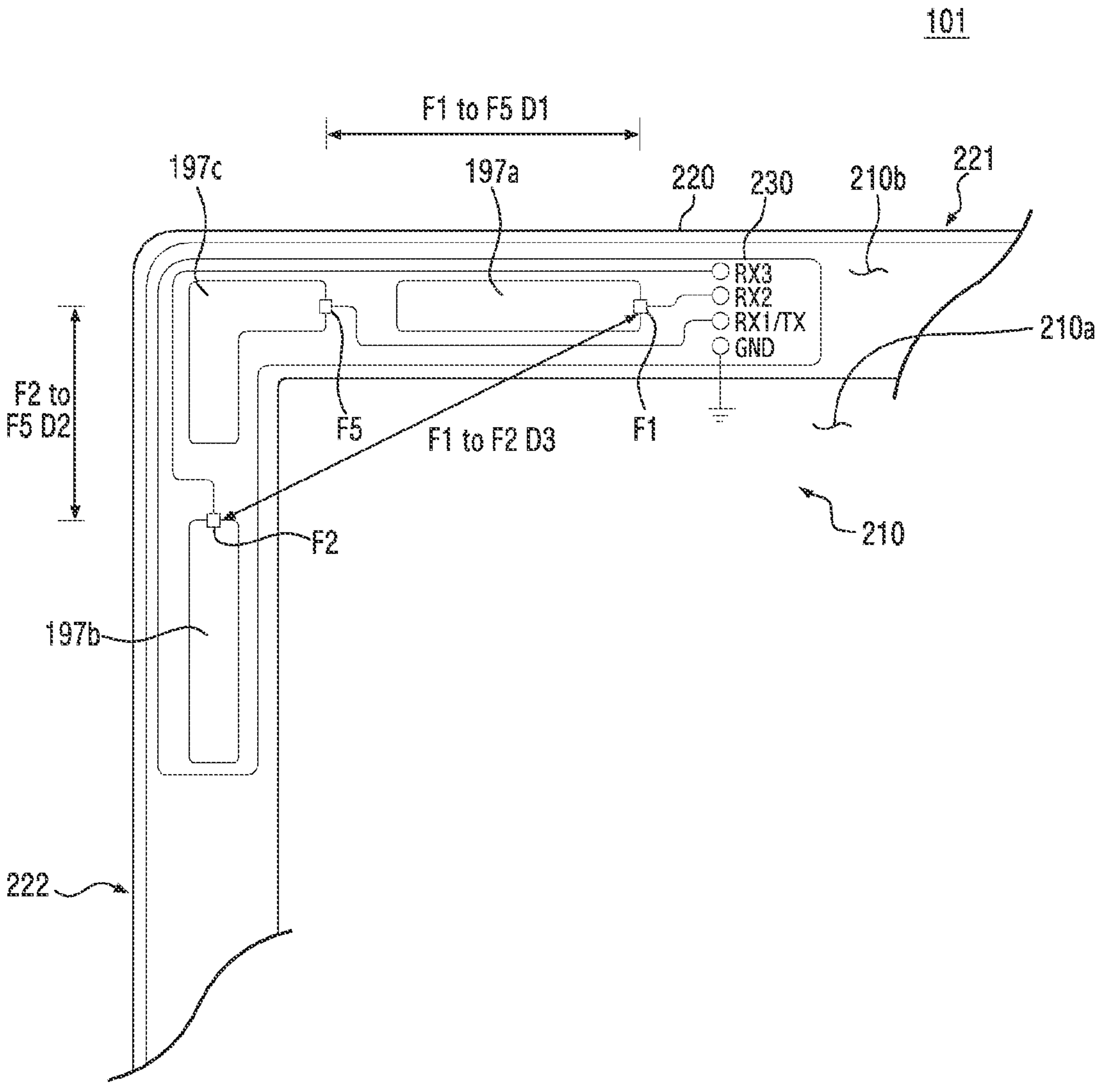
FIG. 10 illustrates a plurality of antennas of an electronic device according to an embodiment.

FIG. 10 illustrates a plurality of antennas of an electronic device according to an embodiment. In FIG. 10, the same reference numerals may be assigned to components corresponding to the aforementioned components, and redundant descriptions may be omitted.

Referring to FIG. 10, an electronic device 101 may include a first antenna 197*a* and second antenna 197*b* disposed on an FPCB 230, and a third antenna 197*c* formed in an elbow shape constituting a right angle and located between the first antenna 197*a* and the second antenna 197*b*. For example, on the FPCB 230 extending from a first edge region 221 corresponding to an edge of a first face 220*a* to a second edge region 222 perpendicular to the first edge region 221, the first antenna 197*a* and the second antenna 197*b* may be disposed to correspond respectively to the first edge region 221 and the second edge region 222, and the third antenna 197*c* may be disposed to share part of the first edge region 221 and part of the second edge region 222 based on the elbow shape constituting the right angle. Accordingly, the third antenna 197*c* may have the elbow shape so as to be disposed by sharing part of the first edge region 221 and part of the second edge region 222. The third antenna 197*c* having the elbow shape may generate a beam of a radiation pattern having a relatively wider coverage than the first antenna 197*a* and the second antenna 197*b*. For example, the third antenna 197*c* may generate a beam of an omni-directional radiation pattern in a direction corresponding to the first edge region 221 and the second edge region 222.

The electronic device 101 may transmit/receive an RF signal or data with respect to an external electronic device 400 by using the first antenna 197*a*, the second antenna 197*b*, and the third antenna 197*c*. For example, the electronic device 101 may transmit (TX) a first RF signal or first data to the external electronic device 400 by using the third antenna 197*c*, and may receive (RX) a second RF signal or second data responding to the transmitted (TX) first RF signal or first data from the external electronic device 400 by using at least two of the first antenna 197*a*, the second antenna 197*b*, and the third antenna 197*c*. In this regard, a fifth feeding point F5 included in the third antenna 197*c* may be electrically coupled to the RX1/TX port included in a wireless communication module 192, and a first feeding point F1 included in the first antenna 197*a* and a second feeding point F2 included in the second antenna 197*b* may be electrically coupled respectively to the RX2 port and third RX port (RX3) included in the wireless communication module 192.

A separation distance of the first antenna 197*a* and the third antenna 197*c* (e.g., a distance D1 between the first feeding point F1 and the fifth feeding point F5), a separation distance of the third antenna 197*c* and the second antenna 197*b* (e.g., a distance D2 between the fifth feeding point F5 and the second feeding point F2), and a separation distance of the first antenna 197*a* and the second antenna 197*b* (e.g., a distance D3 between the first feeding point F1 and the second feeding point F2) may be designed to have a value (e.g., about 10 mm to 30 mm) close to a half-wavelength of an RF signal that can be transmitted/received through an ultra-wideband communication channel (e.g., CH 5 or CH 9) of a specified frequency band (e.g., about 6.2 GHz to 6.7 GHz, or about 7.75 GHz to 8.25 GHz) based on the first antenna 197*a*, the second antenna 197*b*, and the third antenna 197*c*. A separation distance among the first antenna 197*a*, the second antenna 197*b*, and the third antenna 197*c* may be designed to have a value close to a half-wavelength of an RF signal that can be transmitted/received through an ultra-wideband communication channel of the specified frequency band, irrespective of a distance among feeding points included in the respective antennas.

The first antenna 197*a*, the second antenna 197*b*, and the third antenna 197*c* may be selectively operated depending on a posture of the electronic device 101. In this regard, a processor 120 of the electronic device 101 may obtain posture information (e.g., at least one of a roll value, a pitch value, and an azimuth value) of the electronic device 101 from a 9-axis sensor or gyro sensor included in a sensor module 176 to determine a first posture (landscape) or second posture (portrait) of the electronic device 101. The processor 120 may determine the first posture (landscape) of the electronic device 101. In this case, the first antenna 197*a* and third antenna 197*c* aligned by using the first edge region 221 as an axis may be determined as antennas for performing ultra-wideband communication. Alternatively, the processor 120 may determine the second posture (portrait) of the electronic device 101. In this case, the third antenna 197*c* and second antenna 197*b* aligned by using the second edge region 222 as an axis may be determined as antennas for performing ultra-wideband communication.

The processor 120 may control activation for two antennas selected based on the posture of the electronic device 101 and deactivation for another antenna. In this case, the processor 120 may use the activated two antennas to perform 2D positioning for obtaining distance information between the electronic device 101 and the external electronic device 400 and angle-of-arrival information (or direction information) for an RF signal received from the external electronic device 400. The processor 120 may operate each of the first antenna 197*a*, the second antenna 197*b*, and the third antenna 197*c* in an activate state, irrespective of the first posture (landscape) or second posture (portrait) of the electronic device 101, in order to use various positioning algorithms related to determining of a position of the external electronic device 400. In this case, the processor 120 may use the activated three antennas to perform 3D positioning for obtaining distance information between the electronic device 101 and the external electronic device 400, altitude information of the external electronic device 400, and angle-of-arrival information (or direction information) for an RF signal received from the external electronic device 400.

Figure 11:
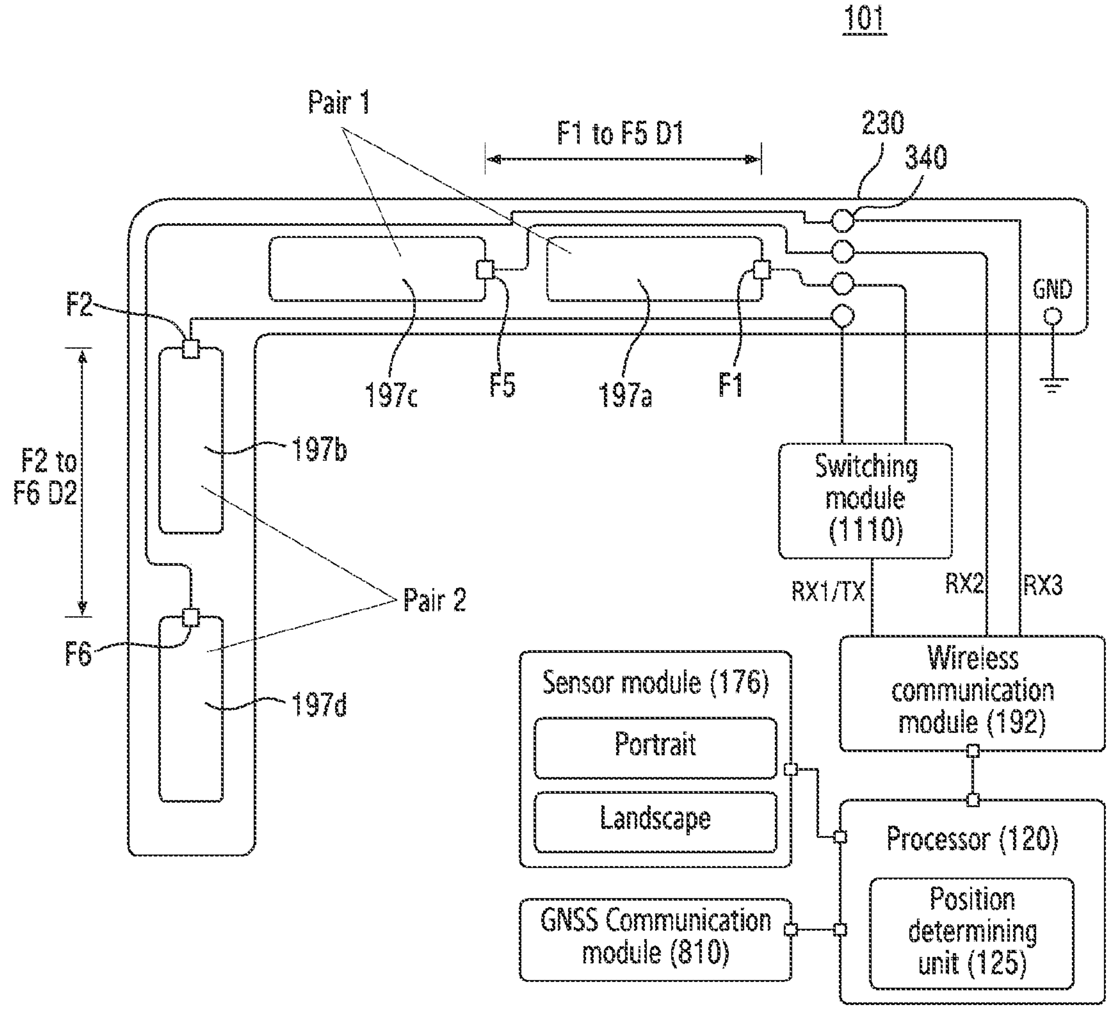
FIG. 11 illustrates a plurality of antennas of an electronic device according to an embodiment.

FIG. 11 illustrates a plurality of antennas of an electronic device according to an embodiment. In FIG. 11, the same reference numerals may be assigned to components corresponding to the aforementioned components, and redundant descriptions may be omitted.

Referring to FIG. 11, an electronic device 101 may include a first antenna 197*a*, a second antenna 197*b*, a third antenna 197*c*, and a fourth antenna 197*d* which are configured as a plurality of pairs on an FPCB 230. The first antenna 197*a* and the third antenna 197*c* may be disposed by constituting a pair 1 in a first edge region 221 corresponding to an edge of a first face 220*a* of a housing 220. In addition, the second antenna 197*b* and the fourth antenna 197*d* may be disposed by constituting a pair 2 in a second edge region 222 corresponding to the edge of the first face 220*a* and perpendicular to the first edge region 221. Accordingly, the pair 1 based on a combination of the first antenna 197*a* and the third antenna 197*c* may be disposed perpendicular to the pair 2 based on a combination of the second antenna 197*b* and the fourth antenna 197*d*. The first antenna 197*a* and third antenna 197*c* constituting the pair 1 may generate a beam of a radiation pattern oriented in the same or similar direction. Correspondingly, the second antenna 197*b* and fourth antenna 197*d* constituting the pair 2 may generate a beam of a radiation pattern oriented in the same or similar direction. The beam direction of the radiation pattern based on the pair 1 constructed of the first antenna 197*a* and the third antenna 197*c* may be different from the beam direction of the radiation pattern based on the pair 2 constructed of the second antenna 197*b* and the fourth antenna 197*d*. For example, the beam direction of the radiation pattern generated by the pair 1 and the beam direction of the radiation pattern generated by the pair 2 may be perpendicular to each other. The electronic device 101 may use the pair 1 constructed of the first antenna 197*a* and the third antenna 197*c* to transmit/receive an RF signal of a frequency band (e.g., about 6.2 GHz to 6.7 GHz) supported by a first ultra-wideband communication channel (e.g., CH 5), and may use the pair 2 constructed of the second antenna 197*b* and the fourth antenna 197*d* to transmit/receive an RF signal of a frequency band (e.g., about 7.75 GHz to 8.25 GHz) supported by a second ultra-wideband communication channel (e.g., CH 9).

The pair 1 based on the combination of the first antenna 197*a* and the third antenna 197*c* and the pair 2 based on the combination of the second antenna 197*b* and the fourth antenna 197*d* may be selectively operated depending on the posture of the electronic device 101. In this regard, the processor 120 of the electronic device 101 may obtain posture information (e.g., at least one of a roll value, a pitch value, and an azimuth value) of the electronic device 101 from a 9-axis sensor or gyro sensor included in a sensor module 176 to determine a first posture (landscape) or second posture (portrait) of the electronic device 101.

The processor 120 may determine the first posture (landscape) of the electronic device 101 based on the posture information. In this case, the first antenna 197*a* and the third antenna 197*c* which are disposed by constituting the pair 1 in the first edge region 221 may be determined as antennas for performing ultra-wideband communication. Alternatively, the processor 120 may determine the second posture of the electronic device 101. In this case, the second antenna 197*b* and the fourth antenna 197*b* which are disposed by constituting the pair 2 may be determined as antennas for performing ultra-wideband communication. Upon determining the first posture (landscape) of the electronic device 101, the processor 120 may control activation of the first antenna 197*a* and the third antenna 197*c* which constitute the pair 1 and may control deactivation of the second antenna 197*b* and the fourth antenna 197*d* which constitute the pair 2. Similarly, upon determining the second posture (portrait) of the electronic device 101, the processor 120 may control activation of the second antenna 197*b* and the fourth antenna 197*d* which constitute the pair 2 and deactivation of the first antenna 197*a* and the third antenna 197*c* which constitute the pair 1.

When transmitting/receiving the RF signal or data with respect to the external electronic device 400 by using the first antenna 197*a* and third antenna 197*c* based on the pair 1, the electronic device 101 may transmit (TX) a first RF signal or first data to the external electronic device 400 by using the first antenna 197*a*, and may receive (RX) a second RF signal or second data responding to the transmitted (TX) first RF signal or first data from the external electronic device 400 by using the first antenna 197*a* and the third antenna 197*c*. In this regard, a first feeding point F1 included in the first antenna 197*a* may be electrically coupled to the RX1/TX port included in a wireless communication module 192, and a fifth feeding point F5 included in the third antenna 197*c* may be electrically coupled to the RX2 port included in the wireless communication module 192.

When using the second antenna 197*b* and fourth antenna 197*d* based on the pair 2, the electronic device 101 may transmit (TX) the first RF signal or first data to the external electronic device 400 by using the second antenna 197*b* and may receive (RX) the second RF signal or second data responding to the transmitted (TX) first RF signal or first data from the external electronic device 400 by using the second antenna 197*b* and the fourth antenna 197*d*. In this regard, a second feeding point F2 included in the second antenna 197*b* may be electrically coupled to the RX1/TX port of the wireless communication module 192, and a sixth feeding point F6 included in the fourth antenna 197*d* may be electrically coupled to the RX3 port of the wireless communication module 192. The electronic device 101 may transmit (TX) the first RF signal or first data to the external electronic device 400 by using the first antenna 197*a* of the pair 1 or the second antenna 197*b* of the pair 2, and may receive (RX) the second RF signal or second data responding to the transmitted (TX) first RF signal or first data from the external electronic device 400 by using all of the first antenna 197*a* and third antenna 197*c* of the pair 1 and the second antenna 197*b* and fourth antenna 197*d* of the pair 2. As such, when the RF signal or data is received (RX) from the external electronic device 400 by using all of the plurality of antennas 197*a*, 197*b*, 197*c*, and 197*d* included in the electronic device 101, reliability of positioning may be improved for the external electronic device 400.

Regarding a selective operation for the pair 1 constructed of the first antenna 197*a* and the third antenna 197*c* and the pair 2 constructed of the second antenna 197*b* and the fourth antenna 197*d*, the electronic device 101 may include a switching module 1110 (or a switching circuit). The switching module 1110 may be electrically coupled to each of the first point F1 of the first antenna 197*a*, the second point F2 of the second antenna 197*b*, and the RX1/TX port of the wireless communication module 192, so that the first feeding point F1 of the first antenna 197*a* or the second feeding point F2 of the second antenna 197*b* is selectively coupled to the RX1/TX port of the wireless communication module 192.

A separation distance between the first antenna 197*a* and the third antenna 197*c* which constitute the pair 1 (e.g., a distance D1 between the first feeding point F1 and the fifth feeding point F5) and a separation distance between the second antenna 197*b* and the fourth antenna 197*d* which constitute the pair 2 (e.g., a distance D2 between the second feeding point F2 and the sixth feeding point F6) may be designed to have a value (e.g., about 10 mm to 30 mm) close to a half-wavelength of an RF signal that can be transmitted/received through an ultra-wideband communication channel (e.g., CH 5 or CH 9) of a specified frequency band (e.g., about 6.2 GHz to 6.7 GHz, or about 7.75 GHz to 8.25 GHz) based on the first antenna 197*a*, the second antenna 197*b*, the third antenna 197*c*, and the fourth antenna 197*d*.

Figure 12:
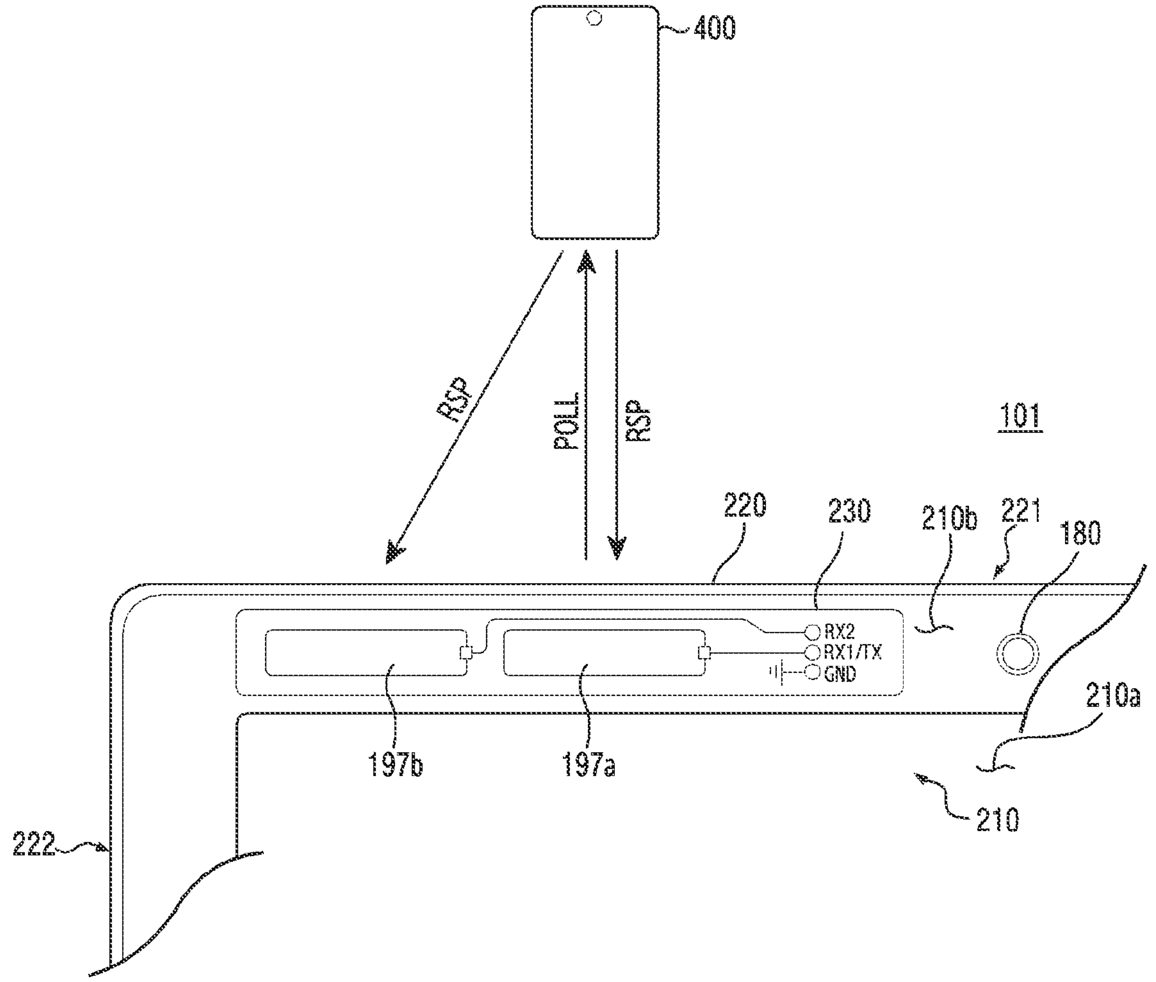
FIG. 12 illustrates a plurality of antennas of an electronic device according to an embodiment.

FIG. 12 illustrates a plurality of antennas of an electronic device according to an embodiment. In FIG. 12, the same reference numerals may be assigned to components corresponding to the aforementioned components, and redundant descriptions may be omitted.

Referring to FIG. 12, an electronic device 101 may include an FPCB 230 disposed not to extend from the first edge region 221 corresponding to an edge of a first face 220*a* of a housing 220 to the second edge region 222. A first antenna 197*a* and a second antenna 197*b* may be disposed on the FPCB 230 along the same axis B-B' illustrated in FIG. 1. The first antenna 197*a* and the second antenna 197*b* may generate a beam of a radiation pattern oriented in the same or similar direction with each other in the edge regions, and may transmit/receive an RF signal or data of a frequency band supported by an ultra-wideband communication channel with respect to an external electronic device 400, based on the generated beam.

A camera module 180 supporting capturing of a still or moving image of the electronic device 101 may be disposed to a region adjacent to an antenna module including the first antenna 197*a*, the second antenna 197*b*, and the FPCB 230. For example, the camera module 180 and the antenna module including the first antenna 197*a*, the second antenna 197*b*, and the FPCB 230 may be disposed along the same axis in the edge regions. In this case, direction information or distance information between the electronic device 101 and the external device, obtained using the first antenna 197*a* and the second antenna 197*b*, may be calculated or accessed to determine a capture mode (e.g., a wide angle mode or a telephoto mode) of the camera module 180. Determining the capture mode of the camera module 180 may include switching a current capture mode of the camera module 180 to a determined capture mode, or activating at least one camera module suitable for the determined capture mode among a plurality of camera modules included in the electronic device 101 and setting the capture mode of the activated at least one camera module to the determined capture mode.

Figure 13:
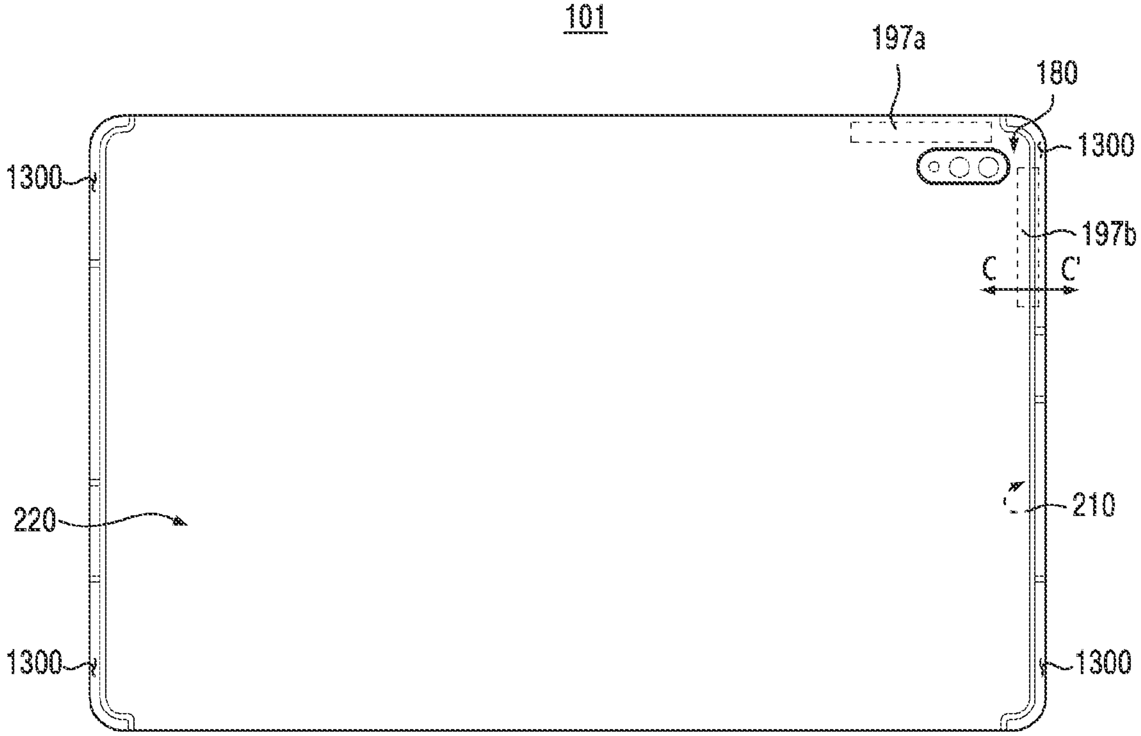
FIG. 13 illustrates an electronic device according to an embodiment.
Figure 14:
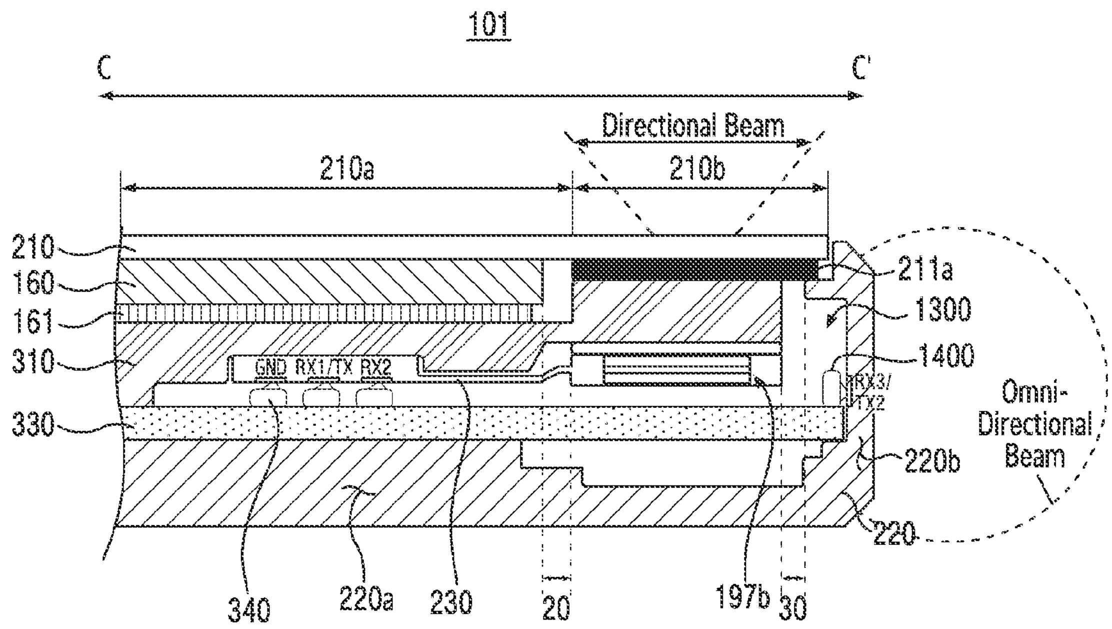
FIG. 14 illustrates a cross-section of an electronic device in one direction according to an embodiment.
Figure 15:
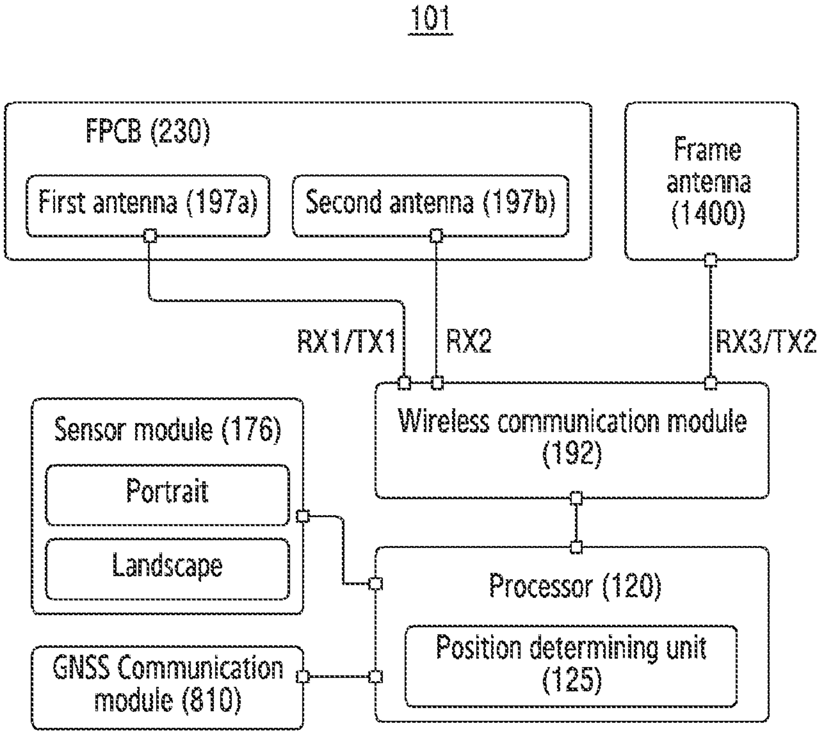
FIG. 15 illustrates some components of an electronic device according to an embodiment.

FIG. 13 illustrates an electronic device according to an embodiment. FIG. 14 illustrates a cross-section of an electronic device in one direction according to an embodiment. FIG. 15 illustrates some components of an electronic device according to an embodiment. In FIGS. 13, 14, and 15, the same reference numerals may be assigned to components corresponding to the aforementioned components, and redundant descriptions may be omitted. In addition, one direction of the electronic device may be referred to as a direction C-C' illustrated in FIG. 13.

Referring to FIGS. 13, 14, and 15, an electronic device 101 may include a first antenna 197*a* and second antenna 197*b* generating a beam of a directional radiation pattern in a direction facing a window plate 210, and a fifth antenna 1400 (or a frame antenna) generating a beam of an omni-directional radiation pattern in a direction facing a first face 220*a* of a housing 220, a second face 220*b* of the housing 220, and the window plate 210.

The fifth antenna 1400 (or the frame antenna) may transmit/receive an RF signal for a direction oriented or not arrived by a beam of a radiation pattern generated by the first antenna 197*a* and the second antenna 197*b*, the direction facing the first face 220*a* of the housing 220, the second face 220*b* of the housing 220, and the window plate 210. Accordingly, the electronic device 101 may use at least one of the first antenna 197*a* and the second antenna 197*b* to transmit/receive an RF signal for a front side direction facing the window plate 210 of the electronic device 101, and may use the fifth antenna 1400 to transmit an RF signal for the front side direction facing the window plate 210, rear side direction facing the first face 220*a* of the housing 220, and lateral side direction facing the second face 220*b* of the housing 220 of the electronic device 101.

The fifth antenna 1400 (or the frame antenna) may be activated in a low-power state, sleep state, or standby state of the electronic device 101, and may transmit/receive an RF signal with respect to an external electronic device 400 to support obtaining of distance information between the electronic device 101 and the external electronic device 400. When positioning on the external electronic device 400 is performed based on the distance information obtained using the fifth antenna 1400, the electronic device 101 may control activation of the first antenna 197*a* and the second antenna 197*b*, and may use the first antenna 197*a* and the second antenna 197*b* to obtain angle-of-arrival information (or direction information) for an RF signal received from the external electronic device 400.

The electronic device 101 may use the activated fifth antenna 1400 to receive (or detect) a first RF signal (e.g., a signal including a poll message (or packet) indicating a distance measurement request) transmitted (or broadcast) from the external electronic device 400 according to a specified ranging scheme, in the low-power state, the sleep state, or the standby state. In this case, the electronic device 101 may use the fifth antenna 1400 in the activate state to transmit a second RF signal responding to reception (or detection) of the first RF signal (e.g., a signal including a response message (or packet) responding to the poll message (or packet)). In this operation, the first antenna 197*a* and the second antenna 197*b* may be controlled in an inactive state.

The fifth antenna (or the frame antenna) may be disposed inside a space 1300 constructed by part of the second face 220*b* of the housing 220. In this regard, a main PCB 330 disposed to an inner space of the electronic device 101 may extend to the space 1300 constructed by the second face 220*b* of the housing 220, and the fifth antenna 1400 may be disposed on the main PCB 330 on the space 1300.

The electronic device 101 may use the first antenna 197*a*, the second antenna 197*b*, and the fifth antenna 1400 in order to use various positioning algorithms related to determining of a position of an external electronic device 400. For example, the electronic device 101 may use at least one of the first antenna 197*a* and the fifth antenna 1400 to transmit (TX) a first RF signal or first data to the external electronic device 400, and may use at least two of the first antenna 197*a*, the second antenna 197*b*, and the fifth antenna 1400 to receive (RX) a second RF signal or second data responding to the transmitted (TX) first RF signal or first data from the external electronic device 400. In this regard, the first antenna 197*a* (or a feeding point included in the first antenna 197*a*) may be electrically coupled to the RX1/first TX port included in a wireless communication module 192, the second antenna 197*b* (or a feeding point included in the second antenna 197*b*) may be electrically coupled to the RX2 port included in the wireless communication module 192, and the fifth antenna 1400 (or a feeding point included in the fifth antenna 1400) may be electrically coupled to the RX3 port/second TX port of the wireless communication module 192.

The electronic device 101 may include the plurality of spaces 1300 constructed by the second face 220*b* of the housing 220 and may include the plurality of fifth antennas 1400 disposed respectively to the plurality of spaces 1300. Although it is illustrated in FIG. 13 that the electronic device 101 includes the four spaces 1300, the number of the plurality of spaces 1300 may vary when implemented, depending on a set structure design of the electronic device 10. Therefore, the number of the plurality of fifth antennas 1400 disposed in the plurality of spaces 1300 may also vary when implemented.

Some of the plurality of fifth antennas 1400 may support communication of a protocol different from that of ultra-wideband communication Bluetooth™ low energy (BLE) communication which consumes relatively low power. The some of the fifth antenna 1400 may transmit (or broadcast) a signal for detecting the external electronic device 400, based on the BLE communication, and may receive a signal responding to the transmitted (or broadcast) signal from the external electronic device 400. The signal received from the external electronic device 400 by using the some of the fifth antennas 1400 may include session identification (ID) information for establishing ultra-wideband communication with the external electronic device 400.

When the external electronic device 400 is recognized (or detected) based on BLE communication using the some of the fifth antennas 1400, the electronic device 101 may use the session ID information included in the received signal to establish an ultra-wideband channel connection of a frequency band supported by ultra-wideband communication with the external electronic device 400. In this operation, the electronic device 101 may control activation of the first antenna 197*a*, the second antenna 197*b*, and the remaining at least one fifth antenna 1400 (e.g., the remaining antenna except for the some of the fifth antenna 1400 among the plurality of fifth antennas 1400). The electronic device 101 may use at least one of the activated first antenna 197*a*, second antenna 197*b*, and remaining at least one fifth antenna 140 to transmit (TX) a first RF signal or first data to the external electronic device 400, and may use at least two of the first antenna 197*a*, the second antenna 197*b*, and remaining at least one fifth antenna 140 to receive (RX) a second RF signal or second data responding to the transmitted (TX) first RF signal or first data from the external electronic device 400.

Although the electronic device 101 having a bar-type or plate-type exterior is illustrated in the drawings described above, the disclosure is not limited thereto. For example, the electronic device 101 may include various mechanisms in which a shape thereof is deformable, such as a foldable electronic device, a rollable electronic device, or an extendable electronic device. Accordingly, the shape of the electronic device 101 may be deformed depending on a user's need, and a size or area of a screen display region (or an active region) included in a display may be adjusted in association with the deformation of the shape of the electronic device 101.

According to an embodiment, an electronic device may include a window plate including a transparent region and an opaque region surrounding the transparent region, a display disposed below the transparent region of the window plate, a housing including a first face corresponding to a rear face of the display and a second face corresponding to a side face of the display, the housing surrounding the rear face and the side face of the display, a plurality of antennas disposed between the opaque region of the window plate and the first face of the housing, and a wireless communication module electrically coupled to the plurality of antennas and supporting ultra-wideband communication by using the plurality of antennas.

The plurality of antennas may include a first antenna disposed along a first edge region corresponding to an edge of the first face of the housing, and a second antenna disposed along a second edge region corresponding to the edge of the first face of the housing and perpendicular to the first edge region.

The electronic device may further include an FPCB extending from the first edge region to the second edge region.

The first antenna and the second antenna may be disposed on the FPCB.

The electronic device may further include a support frame disposed below the display. One region of the support frame may be disposed to be in contact with the opaque region of the window plate by extending below the opaque region of the window plate.

A region of the FPCB may be disposed to be in contact with a rear face of the support frame extending below the opaque region of the window plate.

The electronic device may further include a support frame disposed below the display. One region of the support frame may be disposed spaced apart by a specified interval from the opaque region of the window plate by extending below the opaque region of the window plate.

A first region of the FPCB may be disposed between the opaque region of the window plate and the support frame spaced apart by a specified interval from the opaque region of the window plate.

A second region of the FPCB may extend by penetrating the support frame through a slit constructed at the support frame.

A region of the FPCB may be spaced apart by a first distance from the display and may be spaced apart by a second distance from the second face of the housing.

The electronic device may further include a camera module disposed to a region adjacent to the plurality of antennas.

The first antenna may include a first point electrically coupled to a first RX port and a first TX port which are included in the wireless communication module, and the second antenna may include a second point electrically coupled to a second RX port included in the wireless communication module.

A distance between the first point of the first antenna and the second point of the second antenna may correspond to a half-wavelength of an RF signal that can be transmitted/received through a specified frequency band supported by the ultra-wideband communication, based on the first antenna and the second antenna.

The first antenna may include a first point supporting a first ultra-wideband communication channel and a third point constructed at a position different from the first point on the first antenna and supporting a second ultra-wideband communication channel. The second antenna may include a second point supporting the first ultra-wideband communication channel and a fourth point constructed at a position different from the second point on the second antenna and supporting the second ultra-wideband communication channel.

When operating on the first ultra-wideband communication channel, the first point of the first antenna may be electrically coupled to a first RX port and first TX port included in the wireless communication module, and the second point of the second antenna may be electrically coupled to a second RX port included in the wireless communication module.

When operating on the second ultra-wideband communication channel, the third point of the first antenna may be electrically coupled to the first RX port and first TX port of the wireless communication module, and the fourth point of the second antenna may be electrically coupled to the second RX port of the wireless communication module.

The electronic device may further include a third antenna disposed between the first antenna and the second antenna and sharing part of the first edge region with the first antenna and part of the second edge region with the second antenna.

The electronic device may further include a sensor module, and a processor electrically coupled to the sensor module, the display, the plurality of antennas, and the wireless communication module.

The processor may be configured to determine a first posture of the electronic device by using the sensor module and determine the first antenna and the third antenna as antennas for ultra-wideband communication in response to determining the first posture of the electronic device.

The processor may be configured to determine a second posture of the electronic device by using the sensor module and determine the third antenna and the second antenna as the antennas for the ultra-wideband communication in response to determining the second posture of the electronic device.

The electronic device may further include a third antenna disposed in the first edge region by being aligned with the first antenna to constitute a first pair with the first antenna, and a fourth antenna disposed in the second edge region by being aligned with the second antenna to constitute a second part with the second antenna.

The processor may be configured to determine a first posture of the electronic device by using the sensor module and determine the first pair based on a combination of the first antenna and the third antenna as antennas for ultra-wideband communication in response to determining the first posture of the electronic device.

The processor may be configured to determine a second posture of the electronic device by using the sensor module and determine the second pair based on a combination of the second antenna and the third antenna as the antennas for the ultra-wideband communication in response to determining the second posture of the electronic device.

The electronic device may further include a fifth antenna disposed in a space constructed by part of the second face of the housing.

The first antenna and the second antenna may generate a beam of a directional radiation pattern oriented toward the window plate, and the fifth antenna may generate a beam of an omni-directional radiation pattern oriented toward the first face of the housing, the second face of the housing, and the window plate.

The electronic device may further include a main PCB disposed below the display and extending to a space constructed by part of the second face of the housing.

The fifth antenna may be disposed in one region of the main PCB extending to the space.

According to an embodiment, an electronic device may include a window plate including a transparent region and an opaque region surrounding the transparent region, a display disposed below the transparent region of the window plate, a housing including a first face corresponding to a rear face of the display and a second face corresponding to a side face of the display, the housing surrounding the rear face and the side face of the display, a plurality of antennas disposed between the opaque region of the window plate and the first face of the housing, and including a first antenna disposed along a first edge region corresponding to an edge of the first face of the housing and a second antenna disposed along a second edge region corresponding to the edge of the first face of the housing and perpendicular to the first edge region, a wireless communication module electrically coupled to the plurality of antennas and supporting ultra-wideband communication by using the plurality of antennas, and a processor electrically coupled to the display, the plurality of antennas, and the wireless communication module.

The processor may be configured to receive an RF signal of a specified frequency band from an external electronic device by using at least one of the first antenna and the second antenna, obtain angle-of-arrival information for the RF signal, based on at least part of the RF signal, and determine a position of the external electronic device, based on at least part of the angle-of-arrival information.

The electronic device may further include an FPCB extending from the first edge region to the second edge region.

The first antenna and the second antenna may be disposed on the FPCB.

Figure 16:
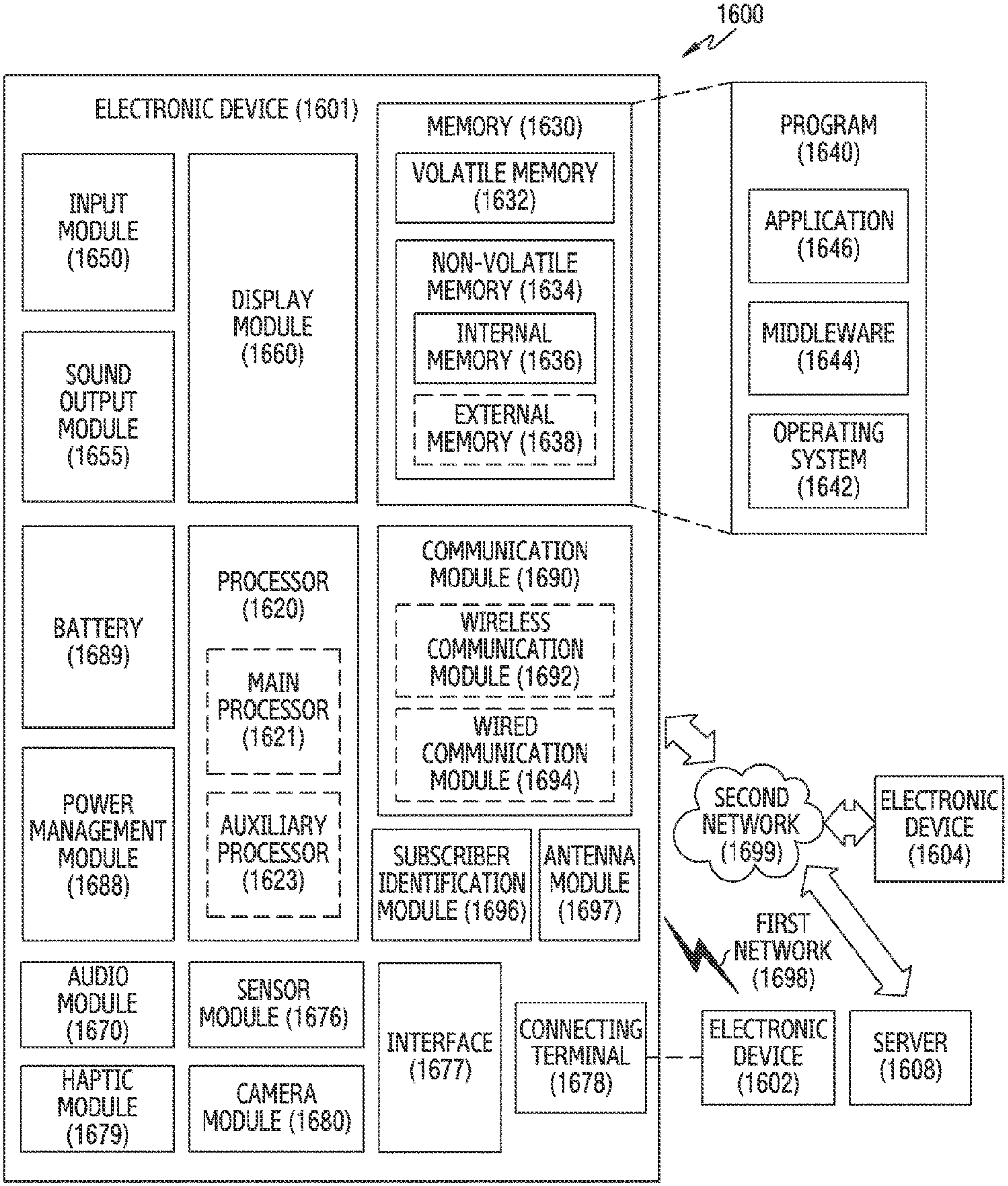
FIG. 16 illustrates an electronic device in a network environment according to an embodiment.

FIG. 16 illustrates an electronic device in a network environment according to an embodiment.

Specifically, FIG. 16 is a block diagram illustrating an electronic device 1601 in a network environment 1600 according to an embodiment. Referring to FIG. 16, the electronic device 1601 in the network environment 1600 may communicate with an electronic device 1602 via a first network 1698 (e.g., a short-range wireless communication network), or at least one of an electronic device 1604 or a server 1608 via a second network 1699 (e.g., a long-range wireless communication network). The electronic device 1601 may communicate with the electronic device 1604 via the server 1608. The electronic device 1601 may include a processor 1620, memory 1630, an input module 1650, a sound output module 1655, a display module 1660, an audio module 1670, a sensor module 1676, an interface 1677, a connecting terminal 1678, a haptic module 1679, a camera module 1680, a power management module 1688, a battery 1689, a communication module 1690, a subscriber identification module (SIM) card 1696, or an antenna module 1697. In some embodiments, at least one of the components (e.g., the connecting terminal 1678) may be omitted from the electronic device 1601, or one or more other components may be added in the electronic device 1601. Some of the components (e.g., the sensor module 1676, the camera module 1680, or the antenna module 1697) may be implemented as a single component (e.g., the display module 1660).

The processor 1620 may execute a program 1640 to control at least one other hardware or software component of the electronic device 1601 coupled with the processor 1620 and may perform various data processing or computation. As at least part of the data processing or computation, the processor 1620 may store a command or data received from another component (e.g., the sensor module 1676 or the communication module 1690) in volatile memory 1632, process the command or the data stored in the volatile memory 1632, and store resulting data in non-volatile memory 1634. The processor 1620 may include a main processor 1621 (e.g., a central processing unit (CPU) or an application processor (AP)), or an auxiliary processor 1623 (e.g., a graphics processing unit (GPU), a neural processing unit (NPU), an image signal processor (ISP), a sensor hub processor, or a communication processor (CP)) that is operable independently from, or in conjunction with, the main processor 1621. For example, when the electronic device 1601 includes the main processor 1621 and the auxiliary processor 1623, the auxiliary processor 1623 may be adapted to consume less power than the main processor 1621, or to be specific to a specified function. The auxiliary processor 1623 may be implemented as separate from, or as part of the main processor 1621.

The auxiliary processor 1623 may control at least some of functions or states related to at least one component (e.g., the display module 1660, the sensor module 1676, or the communication module 1690) among the components of the electronic device 1601, instead of the main processor 1621 while the main processor 1621 is in an inactive (e.g., sleep) state, or together with the main processor 1621 while the main processor 1621 is in an active state (e.g., executing an application). The auxiliary processor 1623 (e.g., an image signal processor or a communication processor) may be implemented as part of another component (e.g., the camera module 1680 or the communication module 1690) functionally related to the auxiliary processor 1623. The auxiliary processor 1623 (e.g., the neural processing unit) may include a hardware structure specified for artificial intelligence model processing. An artificial intelligence model may be generated by machine learning performed by the electronic device 1601 where the artificial intelligence is performed or via a separate server 1608. Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 1630 may store various data used by at least one component of the electronic device 1601. The various data may include the program 1640 and input data or output data for a command related thereto. The memory 1630 may include the volatile memory 1632 or the non-volatile memory 1634.

The program 1640 may be stored in the memory 1630 as software and may include an operating system (OS) 1642, middleware 1644, or an application 1646.

The input module 1650 may receive a command or data to be used by another component (e.g., the processor 1620) of the electronic device 1601, from the outside (e.g., a user) of the electronic device 1601. The input module 1650 may include a microphone, a mouse, a keyboard, a key (e.g., a button), or a digital pen (e.g., a stylus pen).

The sound output module 1655 may output sound signals to the outside of the electronic device 1601. The sound output module 1655 may include a speaker or a receiver. The speaker may be used for general purposes, such as playing multimedia or playing record. The receiver may be used for receiving incoming calls. The receiver may be implemented as separate from, or as part of the speaker.

The display module 1660 may visually provide information to the outside (e.g., a user) of the electronic device 1601. The display module 1660 may include a display, a hologram device, or a projector and control circuitry to control a corresponding one of the display, hologram device, and projector. The display module 1660 may include a touch sensor adapted to detect a touch, or a pressure sensor adapted to measure the intensity of force incurred by the touch.

The audio module 1670 may convert a sound into an electrical signal and vice versa. The audio module 1670 may obtain the sound via the input module 1650 or output the sound via the sound output module 1655 or a headphone of an external electronic device (e.g., an electronic device 1602) directly (e.g., wiredly) or wirelessly coupled with the electronic device 1601.

The sensor module 1676 may detect an operational state (e.g., power or temperature) of the electronic device 1601 or an environmental state (e.g., a state of a user) external to the electronic device 1601, and then generate an electrical signal or data value corresponding to the detected state. The sensor module 1676 may include a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 1677 may support one or more specified protocols to be used for the electronic device 1601 to be coupled with the external electronic device 1602 directly (e.g., wiredly) or wirelessly. The interface 1677 may include a high definition multimedia interface (HDMI), a universal serial bus (USB) interface, a secure digital (SD) card interface, or an audio interface.

A connecting terminal 1678 may include a connector via which the electronic device 1601 may be physically connected with the external electronic device 1602. The connecting terminal 1678 may include an HDMI connector, a USB connector, an SD card connector, or an audio connector (e.g., a headphone connector).

The haptic module 1679 may convert an electrical signal into a mechanical stimulus (e.g., a vibration or a movement) or electrical stimulus which may be recognized by a user via his tactile sensation or kinesthetic sensation. The haptic module 1679 may include a motor, a piezoelectric element, or an electric stimulator.

The camera module 1680 may capture a still image or moving images. The camera module 1680 may include one or more lenses, image sensors, image signal processors, or flashes.

The power management module 1688 may manage power supplied to the electronic device 1601. According to one embodiment, the power management module 1688 may be implemented as at least part of a power management integrated circuit (PMIC).

The battery 1689 may supply power to at least one component of the electronic device 1601. The battery 1689 may include a primary cell which is not rechargeable, a secondary cell which is rechargeable, or a fuel cell.

The communication module 1690 may support establishing a direct (e.g., wired) communication channel or a wireless communication channel between the electronic device 1601 and the external electronic device (e.g., the electronic device 1602, the electronic device 1604, or the server 1608) and performing communication via the established communication channel. The communication module 1690 may include one or more communication processors that are operable independently from the processor 1620 and supports a direct (e.g., wired) communication or a wireless communication. The communication module 1690 may include a wireless communication module 1692 (e.g., a cellular communication module, a short-range wireless communication module, or a GNSS communication module) or a wired communication module 1694 (e.g., a local area network (LAN) communication module or a power line communication (PLC) module). A corresponding one of these communication modules may communicate with the external electronic device via the first network 1698 (e.g., a short-range communication network, such as Bluetooth™, wireless-fidelity (Wi-Fi) direct, or infrared data association (IrDA)) or the second network 1699 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 1692 may identify and authenticate the electronic device 1601 in a communication network, such as the first network 1698 or the second network 1699, using subscriber information (e.g., international mobile subscriber identity (IMSI)) stored in the SIM card 1696.

The wireless communication module 1692 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 1692 may support a high-frequency band (e.g., the millimeter wave (mmWave) band) to achieve, e.g., a high data transmission rate. The wireless communication module 1692 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 1692 may support various requirements specified in the electronic device 1601, an external electronic device (e.g., the electronic device 1604), or a network system (e.g., the second network 1699). The wireless communication module 1692 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 1697 may transmit or receive a signal or power to or from the outside (e.g., the external electronic device) of the electronic device 1601. The antenna module 1697 may include an antenna including a radiating element composed of a conductive material or a conductive pattern formed in or on a PCB. The antenna module 1697 may include a plurality of antennas (e.g., array antennas). In such a case, at least one antenna appropriate for a communication scheme used in the communication network, such as the first network 1698 or the second network 1699, may be selected by the communication module 1690 (e.g., the wireless communication module 1692) from the plurality of antennas. The signal or the power may then be transmitted or received between the communication module 1690 and the external electronic device via the selected at least one antenna. Another component (e.g., a radio frequency integrated circuit (RFIC)) other than the radiating element may be additionally formed as part of the antenna module 1697.

The antenna module 1697 may form an mmWave antenna module. The mmWave antenna module may include a PCB, an RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the PCB, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

Commands or data may be transmitted or received between the electronic device 1601 and the external electronic device 1604 via the server 1608 coupled with the second network 1699. Each of the electronic devices 1602 or 1604 may be a device of a same type as, or a different type, from the electronic device 1601. All or some of operations to be executed at the electronic device 1601 may be executed at one or more of the external electronic devices 1602, 1604, or 1608. For example, if the electronic device 1601 should perform a function or a service automatically, or in response to a request from a user or another device, the electronic device 1601, instead of, or in addition to, executing the function or the service, may request the one or more external electronic devices to perform at least part of the function or the service. The one or more external electronic devices receiving the request may perform the at least part of the function or the service requested, or an additional function or an additional service related to the request and transfer an outcome of the performing to the electronic device 1601. The electronic device 1601 may provide the outcome, with or without further processing of the outcome, as at least part of a reply to the request. To that end, a cloud computing, distributed computing, mobile edge computing (MEC), or client-server computing technology may be used, for example. The electronic device 1601 may provide ultra low-latency services using, e.g., distributed computing or mobile edge computing. In another embodiment, the external electronic device 1604 may include an internet-of-things (IoT) device. The server 1608 may be an intelligent server using machine learning and/or a neural network. The external electronic device 1604 or the server 1608 may be included in the second network 1699. The electronic device 1601 may be applied to intelligent services (e.g., smart home, smart city, smart car, or healthcare) based on a 5G communication technology or IoT-related technology.

While the disclosure has been described with reference to various embodiments, various changes may be made without departing from the spirit and the scope of the present disclosure, which is defined, not by the detailed description and embodiments, but by the appended claims and their equivalents.

What is claimed is:

1. An electronic device, comprising:

a window plate comprising a transparent region and an opaque region surrounding the transparent region;

a display disposed below the transparent region of the window plate;

a support frame disposed below the display:

a housing comprising a first face corresponding to a rear face of the display and a second face corresponding to a side face of the display, the housing surrounding the rear face and the side face of the display;

a plurality of antennas disposed between the opaque region of the window plate and the first face of the housing, wherein the opaque region of the window plate is formed along an edge of the housing;

a flexible printed circuit board (FPCB) having a first region and a second region; and a wireless communication module electrically coupled to the plurality of antennas and supporting ultra-wideband communication by using the plurality of antennas, wherein the plurality of antennas comprises:

a first antenna disposed along a first edge region below a first edge of the opaque region of the window plate; and a second antenna disposed along a second edge region corresponding to a second edge of the opaque region of the window plate longer than the first edge and extending perpendicularly from the first edge, wherein the FPCB extends from the first edge region to the second edge region, and wherein the second region of the FPCB extends by penetrating the support frame through a slit constructed at the support frame.

2. The electronic device of claim 1, wherein the first antenna and the second antenna are disposed on the FPCB.

3. The electronic device of claim 2, wherein one region of the support frame is disposed to be in contact with the opaque region of the window plate by extending below the opaque region of the window plate.

4. The electronic device of claim 3, wherein one region of the FPCB is disposed to be in contact with a rear face of the support frame extending below the opaque region of the window plate.

5. The electronic device of claim 2, wherein one region of the support frame is disposed spaced apart by a specified interval from the opaque region of the window plate by extending below the opaque region of the window plate.

6. The electronic device of claim 5, wherein the first region of the FPCB is disposed between the opaque region of the window plate and the support frame spaced apart by a specified interval from the opaque region of the window plate.

7. The electronic device of claim 2, wherein one region of the FPCB is spaced apart by a first distance from the display and is spaced apart by a second distance from the second face of the housing.

8. The electronic device of claim 1, further comprising a camera module disposed to a region adjacent to the plurality of antennas.

9. The electronic device of claim 1, wherein the first antenna comprises a first point electrically coupled to a first reception (RX) port and a first transmission (TX) port which are comprised in the wireless communication module, and wherein the second antenna comprises a second point electrically coupled to a second RX port comprised in the wireless communication module.

10. The electronic device of claim 9, wherein a distance between the first point of the first antenna and the second point of the second antenna corresponds to a half-wavelength of a radio frequency (RF) signal that can be transmitted/received through a specified frequency band supported by the ultra-wideband communication, based on the first antenna and the second antenna.

11. The electronic device of claim 1, wherein the first antenna comprises a first point supporting a first ultra-wideband communication channel and a third point constructed at a position different from the first point on the first antenna and supporting a second ultra- wideband communication channel, and wherein the second antenna comprises a second point supporting the first ultra-wideband communication channel and a fourth point constructed at a position different from the second point on the second antenna and supporting the second ultra-wideband communication channel.

12. The electronic device of claim 11, wherein, when operating on the first ultra-wideband communication channel, the first point of the first antenna is electrically coupled to a first RX port and first TX port comprised in the wireless communication module, and the second point of the second antenna is electrically coupled to a second RX port comprised in the wireless communication module, and wherein, when operating on the second ultra-wideband communication channel, the third point of the first antenna is electrically coupled to the first RX port and first TX port of the wireless communication module, and the fourth point of the second antenna is electrically coupled to the second RX port of the wireless communication module.

13. The electronic device of claim 1, further comprising a third antenna disposed between the first antenna and the second antenna and sharing part of the first edge region with the first antenna and part of the second edge region with the second antenna.

14. The electronic device of claim 13, further comprising:

a sensor module; and a processor electrically coupled to the sensor module, the display, the plurality of antennas, and the wireless communication module, wherein the processor is configured to:

determine a first posture of the electronic device by using the sensor module, and determine the first antenna and the third antenna as antennas for ultra-wideband communication in response to determining the first posture of the electronic device; and determine a second posture of the electronic device by using the sensor module and determine the third antenna and the second antenna as the antennas for the ultra-wideband communication in response to determining the second posture of the electronic device.

15. The electronic device of claim 1, further comprising:

a third antenna disposed in the first edge region by being aligned with the first antenna to constitute a first pair with the first antenna; and a fourth antenna disposed in the second edge region by being aligned with the second antenna to constitute a second part with the second antenna.

16. The electronic device of claim 15, further comprising:

a sensor module; and a processor electrically coupled to the sensor module, the display, the plurality of antennas, and the wireless communication module, wherein the processor is configured to:

determine a first posture of the electronic device by using the sensor module, and determine the first pair based on a combination of the first antenna and the third antenna as antennas for ultra-wideband communication in response to determining the first posture of the electronic device; and determine a second posture of the electronic device by using the sensor module and determine the second pair based on a combination of the second antenna and the third antenna as the antennas for the ultra-wideband communication in response to determining the second posture of the electronic device.

17. The electronic device of claim 1, further comprising a fifth antenna disposed in a space constructed by part of the second face of the housing, wherein the first antenna and the second antenna generate a beam of a directional radiation pattern oriented toward the window plate, and wherein the fifth antenna generates a beam of an omni-directional radiation pattern oriented toward the first face of the housing, the second face of the housing, and the window plate.

18. The electronic device of claim 17, further comprising a main PCB disposed below the display and extending to a space constructed by part of the second face of the housing, wherein the fifth antenna is disposed in one region of the main PCB extending to the space.

19. An electronic device, comprising:

a window plate comprising a transparent region and an opaque region surrounding the transparent region;

a display disposed below the transparent region of the window plate;

a support frame disposed below the display;

a housing comprising a first face corresponding to a rear face of the display and a second face corresponding to a side face of the display, the housing surrounding the rear face and the side face of the display, wherein the opaque region of the window plate is formed along an edge of the housing;

a plurality of antennas disposed between the opaque region of the window plate and the first face of the housing and comprising a first antenna disposed along a first edge region below a first edge of the opaque region of the window plate and a second antenna disposed along a second edge region below a second edge of the opaque region of the window plate longer than the first edge and extending perpendicularly from the first edge;

a flexible printed circuit board (FPCR) having a first region and a second region;

a wireless communication module electrically coupled to the plurality of antennas and supporting ultra-wideband communication by using the plurality of antennas; and a processor electrically coupled to the display, the plurality of antennas, and the wireless communication module, wherein the processor is configured to:

receive a radio frequency (RF) signal of a specified frequency band from an external electronic device by using at least one of the first antenna and the second antenna;

obtain angle-of-arrival information for the RF signal, based on at least part of the RF signal; and determine a position of the external electronic device, based on at least part of the angle-of-arrival information, wherein the FPCB extends from the first edge region to the second edge region, and wherein the second region of the FPCB extends by penetrating the support frame through a slit constructed at the support frame.

20. The electronic device of claim 19, wherein the first antenna and the second antenna are disposed on the FPCB.

* * * * *